(12) United States Patent
Lovchik et al.

(10) Patent No.: US 6,244,644 B1
(45) Date of Patent: Jun. 12, 2001

(54) COMPACT DEXTEROUS ROBOTIC HAND

(75) Inventors: Christopher Scott Lovchik, Pearland; Myron A. Diftler, Houston, both of TX (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/236,965

(22) Filed: Jan. 25, 1999

(51) Int. Cl.[7] .............................. B25J 15/10; B25J 17/02
(52) U.S. Cl. .................... 294/111; 294/907; 901/29; 901/36; 901/46
(58) Field of Search .................. 294/106, 111, 294/907; 414/7; 901/29, 31–33, 36, 39, 45, 46, 49; 623/57, 61–65

(56) References Cited

U.S. PATENT DOCUMENTS

| | | | |
|---|---|---|---|
| 4,046,262 | 9/1977 | Vykukal et al. | 214/1 CM |
| 4,246,661 * | 1/1981 | Pinson | 294/111 |
| 4,350,381 | 9/1982 | Hellmann | 294/88 |
| 4,653,793 * | 3/1987 | Guinot et al. | 901/39 |
| 4,821,594 | 4/1989 | Rosheim et al. | 79/479 |
| 4,834,443 * | 5/1989 | Crowder et al. | 901/39 |
| 4,834,761 * | 5/1989 | Walters | 294/111 |
| 4,915,574 * | 4/1990 | Park et al. | 901/49 |
| 4,921,293 | 5/1990 | Ruoff et al. | 294/111 |
| 4,986,723 | 1/1991 | Maeda | 414/729 |
| 5,108,140 * | 4/1992 | Bartholet | 294/106 |
| 5,280,981 * | 1/1994 | Schulz | 294/106 |
| 5,326,369 * | 7/1994 | Schectman | 623/64 |
| 5,378,033 | 1/1995 | Guo et al. | 294/116 |
| 5,437,490 | 8/1995 | Mimura et al. | 294/106 |
| 5,447,403 | 9/1995 | Engler, Jr. | 414/4 |
| 5,476,357 | 12/1995 | Arai | 414/729 |
| 5,570,920 | 11/1996 | Crisman et al. | 294/111 |
| 5,588,688 | 12/1996 | Jacobsen et al. | 294/106 |
| 5,647,723 * | 7/1997 | Rush | 294/111 |
| 5,762,390 * | 6/1998 | Gosselin et al. | 294/106 |

* cited by examiner

*Primary Examiner*—Dean J. Kramer
(74) *Attorney, Agent, or Firm*—Hardie R. Barr

(57) ABSTRACT

A compact robotic hand 10 includes a palm housing 16, a wrist section 12 and a forearm section 16. The palm housing supports a plurality of fingers 18, 20, 22 and one or more movable palm members 24, 25 that cooperate with the fingers to grasp and/or release an object. Each flexible finger 18, 20, 22 comprises a plurality of hingedly connected segments, including a proximal segment 16 pivotally connected to the palm housing. The proximal finger segment 16 includes at least one groove 122 defining first and second cam surfaces 126, 128 for engagement with a cable 60. A plurality of lead screw assemblies 54 each carried by the palm housing are supplied with power from a flexible shaft 92 rotated by an actuator 91, and output linear motion to a cable 60 move a finger. The cable 60 is secured within a respective groove 122 and enables each finger to move between an opened and closed position. A decoupling assembly 288 pivotally connected to a proximal finger segment enables a cable 60 connected thereto to control movement of an intermediate and distal finger segment independent of movement of the proximal finger segment. The dexterous robotic hand closely resembles the function of a human hand yet is light weight and capable of grasping both heavy and light objects with a high degree of precision.

35 Claims, 14 Drawing Sheets

COMPACT DEXTEROUS ROBOTIC HAND

The invention described herein was made in the performance of work under a NASA contract and is subject to the provisions of Section 305 of the National Aeronautics and Space Act of 1958, Public Law 85-568 (72 Stat. 435; 42 U.S.C. 2457).

FIELD OF THE INVENTION

This invention relates to a compact, rugged, dexterous robotic hand that closely resembles the function of a human hand. In particular, the robotic hand includes highly reliable yet simple components which enable the desired movement and function of a plurality of flexible fingers attached to a palm housing, a thumb, and a wrist member. Force is mechanically transmitted from drive components in a forearm portion through the wrist section to operate the plurality of fingers and thumb.

BACKGROUND OF THE INVENTION

The dexterity of the human hand enables it to execute complex and agile movements. Simulated movement of the human hand thus desirably achieves movement in directions having degrees of freedom similar to those in the human hand. Robotic simulation of movement in the human hand is practically limited by the size and weight of the components needed to simulate movement. The size of a robotic hand has conventionally suffered at the expense of obtaining the desired motion, and the desired dexterity of fingers and a thumb are achieved in a complex mechanism which still has limited capabilities. The action of these components does not closely approximate the desired movement of a human hand, and thus control of the robotic hand by a "smart glove" is less accurate.

Robotic devices simulating movement of the human hand frequently tend to sacrifice one or more desired simulated functions for other desired simulated functions. Many robotic hand devices focus on simulating the overall appearance and movement of the human hand while neglecting other equally important features such as the size, weight, mobility and control of the robotic device. Conventional robotic devices are therefore relatively complex, large, cumbersome and difficult to use. The complexity of conventional robotic devices also has resulted in robotic hands which are expensive to manufacture, and are also expensive to maintain.

U.S. Pat. No. 4,986,723 to Maeda and U.S. Pat. No. 5,447,403 to Engler, Jr. each describe a conventional robotic hand. Maeda describes a robot arm that comprises four flexible fingers and a thumb wherein each flexible finger and thumb includes three joints. Pulleys are provided on each joint so that each joint can be bent. The third joint has approximately one-half the bending motion of the second joint. The robot arm described by Maeda offers 18 degrees of freedom that resembles movement of a human arm. As a result, 18 actuators or motors are required to operate this cable wire and pulley system of Maeda. Similarly, Engler, Jr. describes a dexterous programmable robot and control system that includes a hand with four fingers and a thumb. Each finger and thumb have four degrees of freedom which are driven by a cable and pulley system not unlike Maeda. Both Maeda and Engler, Jr. rely upon a complex mechanical drive train to affect bending and rotational movement in the joints provided in the fingers and thumb. As a result, the robotic hands described by Maeda and Engler, Jr. are unreasonably large, heavy and cumbersome, making it difficult to grasp and control delicate or light objects with reasonable precision.

Other conventional robotic devices attempting to simulate movement of the human hand are described by U.S. Pat. No. 4,046,262 to Vykukal et al.; U.S. Pat. No. 4,350,381 to Hellmann; U.S. Pat. No. 4,921,293 to Ruoff et al.; U.S. Pat. No. 5,378,033 to Guo et al.; U.S. Pat. No. 5,347,490 to Mimura et al.; U.S. Pat. No. 5,476,357 to Arai; U.S. Pat. No. 5,570,920 to Crisman et al.; and U.S. Pat. No. 5,588,688 to Jacobson et al. These conventional devices are quite complex and thus expensive, and also are limited by many of the disadvantages described above.

Accordingly, there is a specific need for a dexterous robotic hand that closely resembles the anatomical movement of the human hand yet is lightweight, mobile and capable of grasping both heavy and light object s with precision.

SUMMARY OF THE INVENTION

The dexterous robotic hand generally comprises of a palm housing and a plurality of flexible fingers and a thumb that are each moveably secured to the palm housing. In a preferred embodiment, the dexterous robotic hand includes a forearm section which houses the drive motors and electronics which enable the controlled movement of the fingers and the thumb. The robotic hand includes a two degree of freedom wrist section and a twelve degree of freedom hand that are each discussed in further detail below. The hand includes two dexterous fingers and a thumb each with three degrees of freedom, two grasping fingers each with one degree of freedom, and a hinged palm with one degree of freedom.

The forearm section houses the drive motors, hereinafter also referred to as actuators, as well as the corresponding electronics and wiring, thereby conserving space in the palm housing. The wrist section includes a wrist cuff having a central opening for transmitting power from the drive motor to the fingers, as explained subsequently. A first and a second shockloader may be interconnected between opposing sides of the wrist section and the forearm section for mitigating stress exerted on the robotic hand.

Wrist actuators positioned in the forearm section are operably connected to the palm housing and enable the simultaneous pivotal movement of the robotic hand in directions having at least two degrees of freedom, i.e., the wrist cuff may pivot vertically (pitch) with respect to the forearm section and the palm housing may pivot laterally (yaw) with respect to the wrist section. A wrist sensor may be attached to each of the pair of wrist actuators for sensing the relative position of the wrist section with respect to the forearm section. A plurality of strain gauges may be positioned between the palm housing and the wrist actuators for sensing force on the wrist section.

The robotic hand preferably includes one or more dexterous fingers primarily used for manipulation of an object and one or more grasping fingers primarily used to maintain a stable grasp on the object. In a preferred embodiment, the two dexterous fingers functionally resemble the index and middle fingers (first and second) on the human hand and each allow for three degrees of freedom. The two grasping fingers are each one degree of freedom fingers that functionally resemble the ring and pinkie fingers (third and fourth) on the human hand. The thumb has three degrees of freedom and is skewed with respect to the palm housing to oppose the dexterous fingers. Each grasping finger is positioned opposite the thumb relative to the dexterous fingers. Each finger includes a plurality of hingedly connected segments that resemble the segments of a respective finger on the human hand. A segment sensor may be attached to each of the plurality of hingedly connected segments on a respective finger to sense the relative position of that finger segment as it bends relative to the palm housing.

A shock mount may be positioned between the palm housing and a respective finger for mitigating stress transferred to the finger when jarred towards the palm housing either while the finger is in an opened (extended or straight) position or while the finger is in a closed (bent or grasping) position. The shock mount increases the tolerance of each respective finger to withstand abnormal and/or excessive loads placed thereon, thus improving the overall durability of the robotic hand.

A groove may be provided in the proximal segment of each finger, which is a finger segment connected to the palm housing. The groove defines a first curvilinear cam surface and a second curvilinear cam surface. The second curvilinear cam surface is arced in a direction opposite the first curvilinear cam surface, such that the instantaneous center of curvature of the second cam surface is opposite the groove with respect to the instantaneous center of curvature of the first cam surface.

A plurality of lead screw assemblies are carried by the palm housing. Each lead screw assembly includes a short flexible cable having a coupling end connected to the proximal finger segment. The cable is secured within a respective groove for actuating pivotal movement of the proximal segment relative to the palm housing when the cable is bent along either the first curvilinear cam surface or the second curvilinear cam surface of the groove. The first and second curvilinear cam surfaces defined by a respective groove control the bend radius in the cable while the cable slides along one of these cam surfaces to cause movement of the proximal finger segment. The camming effect of each groove maintains a larger controlled bend radius in the cable compared to pulleys previously used to guide cables in prior art robotic hands. The first and second cam surfaces are configured to provide a constant lever arm between the cable at its initial contact point with one of the cam surfaces and the pivot point of the proximal finger segment throughout the entire range of motion of the finger, i.e., the cable is controlled by the cam surfaces to remain substantially within the same straight line extending from the lead screw housing to the point at which the cable contacts one of the first or second cam surfaces. As a result, the cable is bent across a cam surface having a large bend radius to reduce cable fatigue, and the lever arm force exerted by the lead screw assembly is not dependent upon the position of the finger with respect to the palm housing.

Since each lead screw assembly cable is kept relatively short and its bend radius is controlled by a respective groove, the stiffness of the cable biases the cable to a straight position along its entire length, which then biases the finger in a predetermined partially opened position. The ratio of the cable length to its diameter is such that the cable maintains a minimum rigidity that biases a respective finger towards the open position when the finger is fully closed and biases the finger towards the closed position when the finger is fully extended or straight. The use of short flexible cables instead of pulleys and/or complex gears or linkages also reduces the size and complexity of each finger while permitting each finger to be compliant in the non-working direction.

In a preferred embodiment, the lead screw assembly comprises a tubular sleeve in which a moveable body and a lead screw are partially disposed. The body moves relative to the tubular sleeve along a sleeve axis and interconnects the cable to the lead screw. The lead screw translates rotational movement from the flexible shaft to linear movement of the body along the sleeve axis. The lead screw assembly is thus capable of translating rotation movement of the flexible shaft driven by the motor into linear movement of the cable relative to the palm housing. The robotic hand is accordingly lighter and more compact, yet capable of grasping heavy objects with the same precision as lighter objects. A plurality of lead screw gauges may be attached to a respective lead screw assembly for sensing stress on a respective finger when grasping an object.

A finger actuator in the forearm section rotates a flexible shaft or "flex shaft" which passes through an opening in the wrist cuff to power a lead screw, thereby transmitting rotational movement from the actuator to linear movement of a cable which in turn controllably pivots the proximal segment of a finger with respect to the palm housing. Due to the constant lever arm effect of the first and second cam surfaces of the groove which receives the cable, a selected rotation of the flexible shaft by a respective actuator will cause a predetermined pivotal movement of the proximal finger segment with respect to the palm housing. The tubular sleeve of the lead screw assembly may be fixedly clamped within the palm housing, thereby desirably minimizing the space requirements in the palm housing. Each finger actuator, lead screw assembly, cable, the groove cam surfaces thus reliably allow for the controlled pivotal movement of the proximal finger segment relative to the palm housing without utilizing pulleys, complex gears, or complex linkage mechanisms. Sensors may be attached to each finger actuator for sensing the relative position of the finger with respect to the palm housing.

Controlled movement of the proximal finger segment of each grasping finger regulates movement of both the intermediate segment which is pivotally connected to the proximal segment and the distal segment which is pivotally connected to the intermediate segment. Linkage members interconnecting these grasping finger segments cause each segment to simultaneously bend in equal proportions, i.e., when the grasping finger proximal segment is bent from the straight finger position along an arc of 30 degrees with respect to the palm housing, the intermediate segment of that grasping finger is bent 30 degrees in the same direction with respect to the proximal segment, and the distal segment is bent 30 degrees with respect to the intermediate segment. Each grasping finger may thus be controllably moved in one degree of freedom (pitch movement) relative to the palm housing between the open or straight finger and the closed or bent finger position due to the movement of the proximal finger segment resulting from linear movement of the cable, as discussed above. The resulting movement of the intermediate and distal segments is due to links which interconnect the proximal segment with the intermediate and distal segments. A tension spring may be used to maintain a bias on both the distal and intermediate segments of a grasping finger to bias the grasping finger in an open position, and minimize backlash when these segments are moved in response to movement of the proximal segment.

Each dexterous finger may also include a proximal segment, an intermediate segment and a distal segment, with the proximal segment being controllably moved with respect to the palm housing by a pair of finger actuators, lead screw assemblies, and cables each functionally similar to the drive train assembly. The pair of drive assemblies each on a respective opposing side of a respective dexterous finger proximal segment enable both the pitch and yaw movement of the dexterous finger proximal segment. The intermediate segment of the distal segment is pivotally linked to the proximal segment by a decoupling mechanism which allows the intermediate and distal segment to move independent of movement of the proximal segment. The dexterous finger is thus unlike a grasping finger since the decoupling assembly decouples or separates movement of the proximal segment of the dexterous finger from movement of the intermediate and distal segments of that finger. The thumb of the robotic hand may similarly include components similar to those used in a dexterous finger, including a decoupling assembly which separates movement of the distal thumb segment from movement of the proximal thumb segment.

The decoupling assembly for a dexterous finger includes a decoupling link pivotally connected to the proximal finger segment, with the pivoting movement of that link being controlled by another lead screw assembly, which may be referred to as a decoupling lead screw assembly. The decoupling lead screw assembly may include an actuator within the forearm section, a lead screw assembly, and a short flexible cable as discussed above. The decoupling cable is not positioned within a groove having cam surfaces, but instead is pivotally connected to the decoupling link at a selected point which allows the length of the decoupling cable to remain fixed while the proximal finger segment pivots with respect to the palm housing. Accordingly, the proximal segment of a dexterous finger may be selectively moved without moving either the intermediate segment or distal segment with respect to the proximal segment, and both the intermediate segment and distal segments may be moved without moving the proximal segment of the dexterous finger. The decoupling assembly thus provides an extra degree of movement not provided in a grasping finger by allowing movement of the proximal segment independent of movement of the intermediate and distal segments. A tension spring may be used to connect the distal and intermediate segment of a dexterous finger to bias these segments toward a finger open position and to minimize backlash when the dexterous finger is moved.

A pivoting yoke is positioned between the palm housing and the proximal segment of a dexterous finger to allow for lateral or yaw movement of the proximal segment. The pivoting yoke thus allows the dexterous finger to move closer to a grasping finger and further from the thumb, or closer to the thumb and further from a grasping finger. The dexterous finger achieves both pitch and yaw with respect to the palm housing by a pair of spaced apart grooves each on an opposing side of the finger, with each groove being similar to the grasping finger groove discussed above. This yaw degree of freedom for each dexterous finger may be obtained by operating one finger actuator, one lead screw assembly, and cable which engages the groove on one side of the dexterous finger in a manner different from the corresponding components on the other side of the finger, thereby obtaining a lateral or yaw directed movement of that finger with respect to the palm housing. By independently and simultaneously controlling the actuators which move the cables within the grooves on a dexterous finger, the proximal segment is controlled to both bend (pitch) relative to the palm housing and move laterally (yaw) to open or close the spacing between that dexterous finger and a grasping finger. The use of short flexible cables instead of pulleys or complex gears eliminates a significant number of joints that would otherwise be required to enable movement of the proximal segment in both the pitch and yaw directions. A similar yoke and a similar pair of grooves may be provided to control the yaw movement of the thumb with respect to the palm housing.

In a preferred embodiment, the robotic hand also includes a palm member which pivotally moves relative to the palm housing. The palm member is hingedly connected to the palm housing at one end, and pivotally supports at least one of the plurality of fingers, and preferably at least one of the grasping fingers, at its opposing end. The palm member thus cooperates with a plurality of fingers to improve the dexterity and strength of the robotic hand for grasping both light and heavy objects. A spring may be mounted between the palm housing and the palm member for biasing the palm member toward an open position. The palm member actuator in the forearm section rotates a flexible shaft which passes through the wrist cuff, and a palm lead screw assembly secured to the palm housing controls movement of the palm member with respect to the palm housing. The palm member cable extending from the palm lead screw assembly is connected to the palm member and controllably pivots the palm member relative to the palm housing. The palm member is capable of moving with respect to the palm housing in one degree of freedom to bend (pitch) between an open and closed position.

The thumb includes a proximal segment and a distal segment, and is controllably moved by respective drive assemblies in a manner discussed above for a dexterous finger. The pivotal position of the thumb with respect to the palm housing is skewed so that the thumb is offset with respect to a plane of the palm housing, thereby allowing the thumb to oppose a force exerted on the dexterous fingers. The thumb may be controlled in a yaw direction over a range which is much greater than the yaw movement of the dexterous fingers to allow for its controlled opposition to both the dexterous and the grasping fingers.

It is a principal object of the present invention to provide a robotic hand that functionally simulates a human hand while maintaining mobility, dexterity, and precision in controlling both light and heavy objects.

A related object of the invention is to provide a robotic hand with an actuator package that provides for the controlled movement in various degrees of freedom for the hand components while reducing both the weight and bulk of the actuator package.

It is another object of this invention to provide a robotic hand with fingers that are each connected to one or more finger drive trains that translate rotational movement from one or more corresponding actuators in a forearm section into desired movement of the fingers with respect to a robotic hand palm housing.

A related object of this invention is to provide a robotic hand with a finger drive train that is compact, lightweight and durable.

Yet another object of this invention is to provide a robotic hand that is relatively simple and inexpensive to manufacture and maintain compared to prior art robotic hands.

A feature of the invention provides for the movement of a cable along cam surfaces of a groove in the proximal segment of a finger, with the cam surfaces being configured to maintain a substantially constant lever arm for the force exerted by the cable.

It is a feature of this invention to provide a robotic hand with at least one dexterous finger, at least one grasping finger and a thumb.

Another feature of the invention is a robotic hand wherein the drive train for controlling movement of the fingers passes through an opening in the wrist section which interconnects the forearm section with the palm housing.

Another feature of this invention provides at least one of the dexterous fingers with a decoupling assembly in order that the proximal segment of that finger and other hingedly connected segments of that finger are capable of independent movement. The decoupling assembly may be pivotally connected to a finger proximal segment.

It is also a feature of this invention that the robotic hand includes one or more grasping fingers each with a plurality of hingedly connected segments that are linked such that movement of a proximal segment results in movement of the other segments of that finger.

Another feature of this invention provides at least one of the dexterous fingers with a yoke to allow for yaw movement of that finger with respect to the palm housing.

Still another feature of the invention is to achieve yaw of a dexterous finger by the differential motion of two cables, with each cable positioned within a respective one of a pair of grooves on opposing sides of the dexterous finger.

Yet another feature of this invention includes a plurality of sensors to sense the relative position of each finger.

Another feature of this invention provides a finger drive train with sensors to sense stress on a respective finger when grasping an object.

Another feature of this invention provides a shock mount positioned between a respective finger and the palm housing for absorbing stress exerted on that finger.

Still another feature of this invention provides a drive train for moving each finger, wherein the drive train includes a flexible shaft extending from an actuator in the forearm section to a lead screw assembly secured to the palm housing.

Yet another feature of the invention is to provide a palm member which is selectively moveable relative to the palm housing to improve the grasping capability of the robotic hand.

It is a significant advantage of this invention to provide the robotic hand with one or more dexterous fingers and thumb that are each capable of moving in directions having at least three degrees of freedom.

It is another advantage of this invention to incorporate a forearm section that houses actuators used to operate the fingers and thumb.

The above and other objects, features and advantages of the present invention will become apparent from the following detailed description, wherein reference is made to the figures in the accompanying drawings.

DETAILED DESCRIPTION OF PREFERRED EMBODIMENTS

Figure 1:
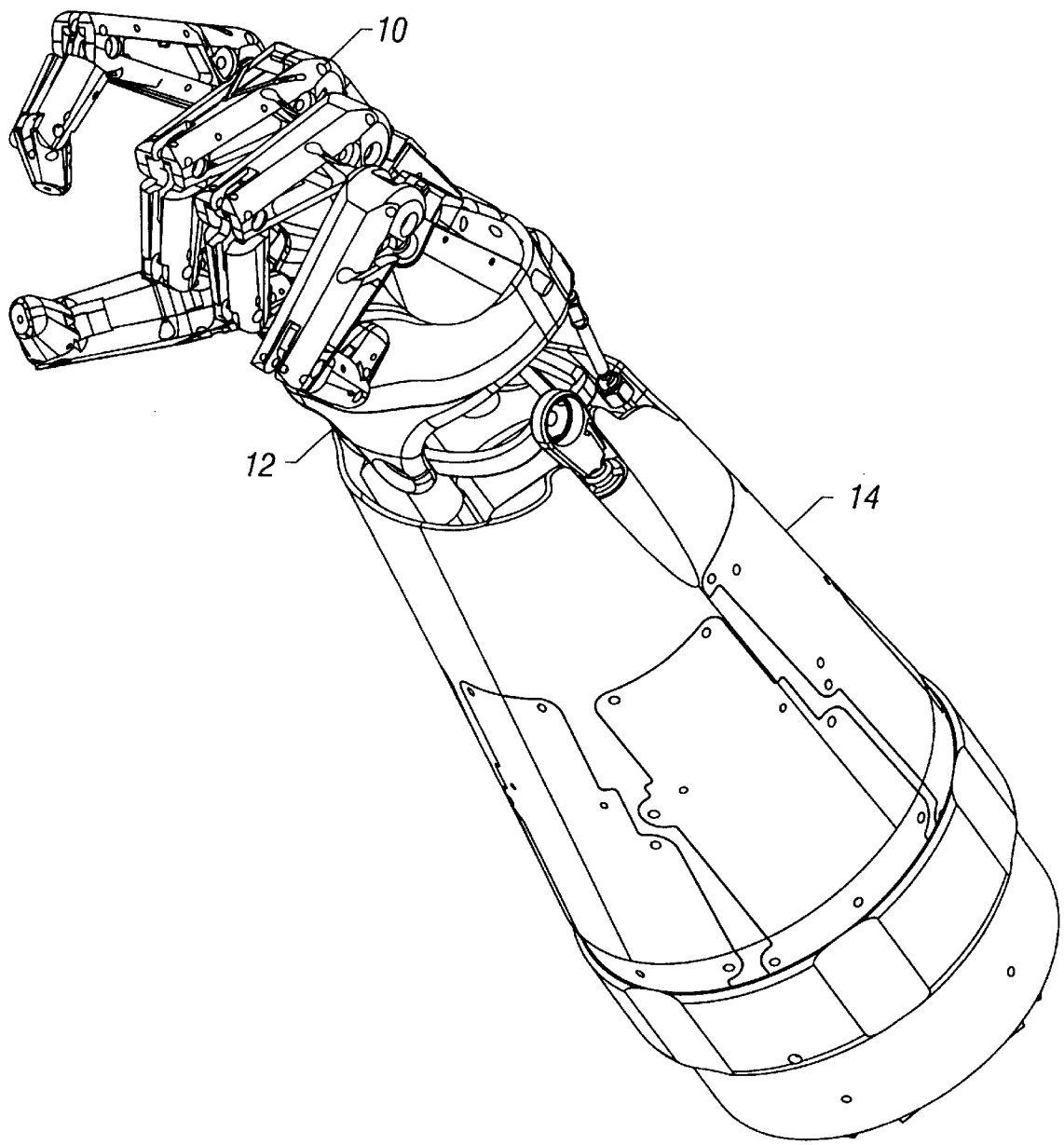
FIG. 1 is a perspective view of the robotic hand, wrist section and forearm section.

Referring generally to FIG. 1, a preferred embodiment of the compact dexterous robotic hand 10 is shown having a plurality of moveable fingers. The robotic hand 10 is attached to a wrist section 12 which is movably connected to a forearm section 14. The robotic hand 10 includes five moveable fingers that closely resemble the fingers on a human hand and are capable of moving in directions having a total of twelve degrees of freedom. Each of the two dexterous fingers and the thumb have three degrees of freedom (two pitch and one yaw); each of the two grasping fingers has one degree of freedom (pitch), and the palm member has one degree of freedom (pitch). The wrist section 12 is capable of moving palm housing 16 in directions having two degrees of freedom (pitch and yaw) relative to the forearm section 14 which houses the motors or actuators, and the circuitry and drive electronics. The robotic hand 10, wrist section 12, and forearm section 14 are individually discussed in further detail below, followed by a discussion of a drive train, a lead screw assembly, the palm, a grasping finger, a dexterous finger, and the thumb.

The Robotic Hand

Figure 2:
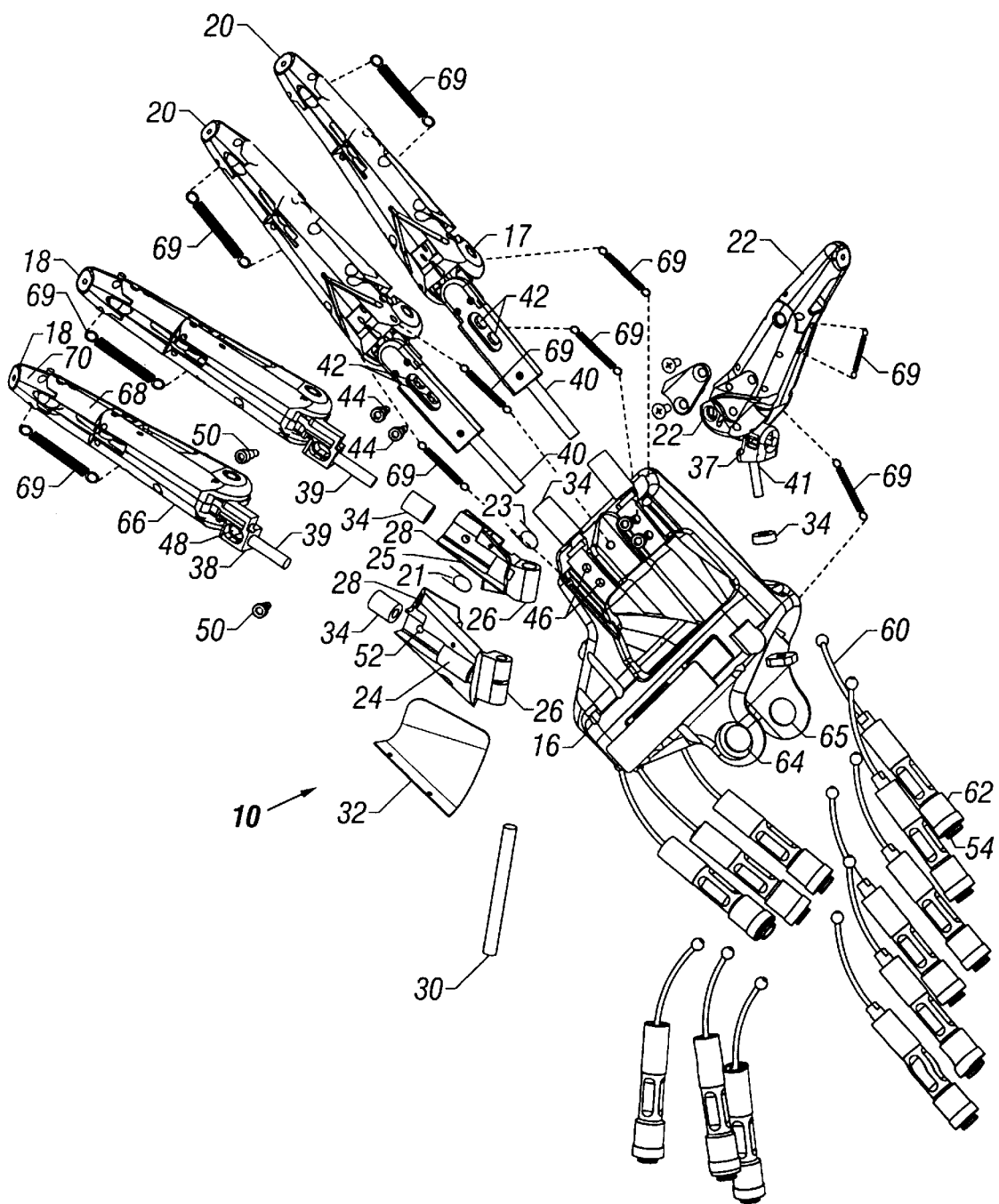
FIG. 2 is an exploded view of the robotic hand including the flexible fingers, palm member, palm housing and lead screw assemblies.

Referring now to FIG. 2, the robotic hand 10 is shown in exploded view from the back of the hand. The robotic hand comprises a palm housing 16, one or more dexterous fingers used for manipulation and one or more grasping fingers used to maintain a stable grasp while manipulating a grasped object. The two dexterous fingers 20 functionally resemble the index and middle fingers (first and second) on the human hand, and each have three degrees of freedom. A three degree of freedom thumb 22 is positioned for opposing the dexterous fingers 20. The two grasping fingers 18 functionally resemble the ring and pinkie fingers (third and fourth) on the human hand, and each have one degree of freedom. Each grasping finger 18, dexterous finger 20 and thumb 22 is movably secured to the palm housing 16. Each grasping finger 18 is positioned opposite the thumb 22 relative to a dexterous finger 20. Various alternative embodiments may include one or more grasping fingers 18 and one or more dexterous fingers 20, depending upon the desired functions to be performed by the robotic hand.

Each grasping finger 18, dexterous finger 20 and thumb 22 is attached to a grasping finger mount 38, a dexterous finger mount 36 and thumb mount 37, respectively. Each grasping finger mount 38, dexterous finger mount 36, and thumb mount 37 includes a cylindrical extension 39, 40 and 41, respectively, that fits through a respective shock mount 34. In one embodiment, each dexterous finger mount 36 is secured to the palm housing 16 by a plurality of screws 44 that pass through corresponding holes 42 in the dexterous finger mount 36 and are threadably secured within corresponding holes 46 in the palm housing 16. Similarly, each grasping finger mount 38 is secured to a respective first and second palm members 24 and 25 by a screw 50 which passes through a hole 48 in the grasping finger mount 38 and is threadably secured within a hole 52 in a respective first and second palm members 24 and 25.

Still referring to FIG. 2, each grasping finger 18, dexterous finger 20 and thumb 22 comprises a plurality of hingedly connected segments that resemble the segments of a respective finger on the human hand. Each grasping finger 18 and dexterous finger 20 include a segment proximal to the palm housing 16 referred to as the proximal segment 66, an intermediate segment 68 and a distal segment 70. The thumb 22 also includes a proximal segment 72 and a distal segment 74. In a preferred embodiment, the robotic hand 10 is equipped with a total of twenty-eight relative movement or position sensors, and fourteen force or tactile sensors. A plurality of embedded absolute position segment sensors 17 may be attached to the plurality of hingedly connected segments on a respective finger for sensing the relative position of a respective segment as it moves or bends. Similarly, a plurality of actuator sensors 19 (see FIG. 4), commonly referred to as integral encoders, may be attached to the plurality of finger and palm actuators 91 and wrist actuators 82 for sensing the relative positions of a respective finger, palm member and palm housing as it moves.

The Wrist Section

Figure 3:
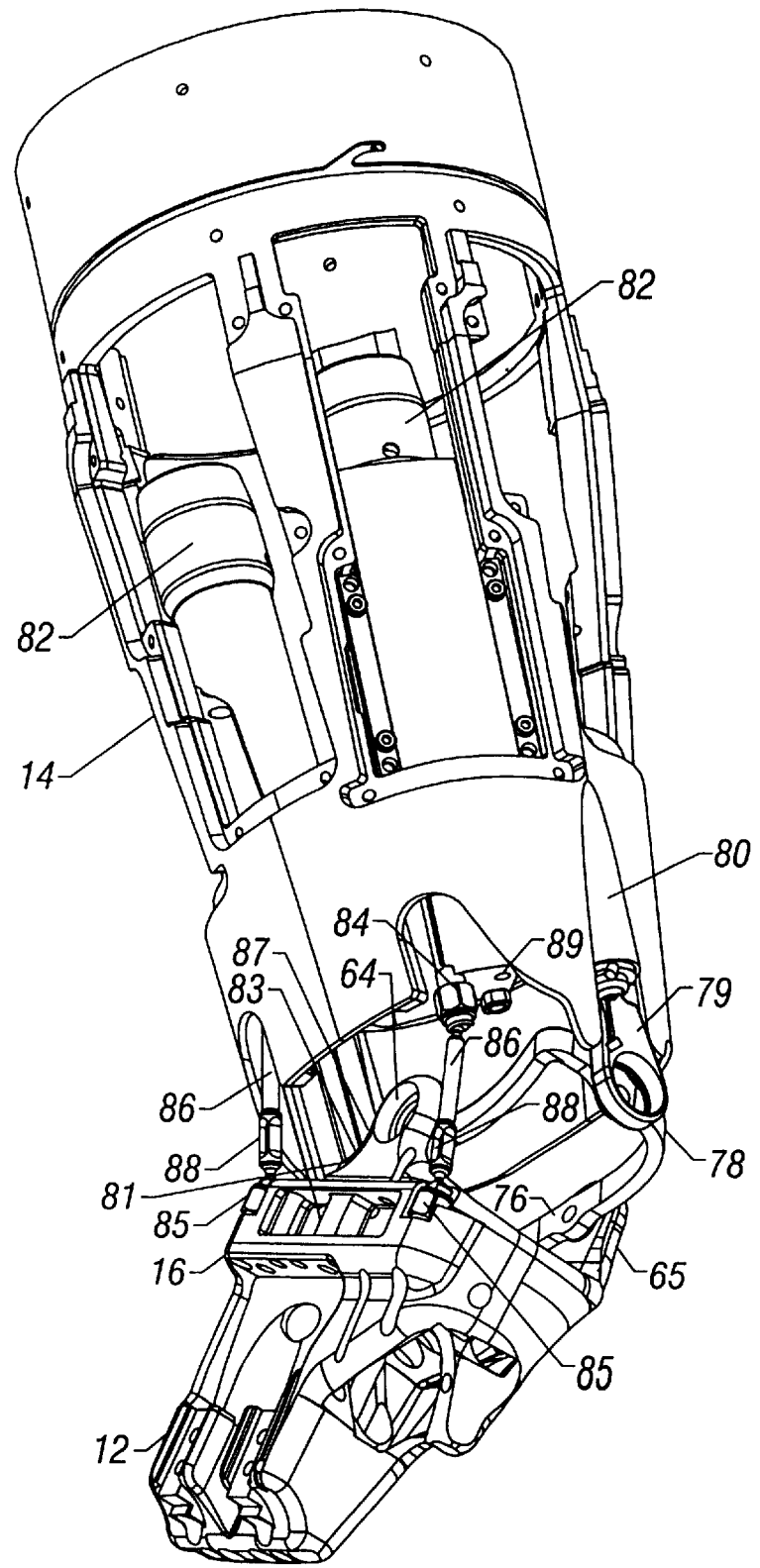
FIG. 3 is a perspective view of the forearm section, wrist section and palm housing.

The wrist section 12, the forearm section 14 and the palm housing 16 are generally shown in FIG. 3 in their partially assembled form. The wrist section 12 includes a central passageway having a large cross-sectional area for receiving the plurality of drive train flexible shafts discussed below. The palm housing 16 includes a first wrist aperture 64 and a second wrist aperture 65 for receipt of the wrist section 12. More particularly, the wrist section 12 includes a wrist cuff 76 that is pivotally attached to the first and second wrist apertures 64 and 65 of the palm housing 16. The pivotal connection between the wrist cuff 76 and the palm housing 16 allows the palm housing 16 to move laterally (yaw) with respect to the wrist cuff 76 by at least +/−30 degrees. A first wrist strut 79 and first shock loader 80 are pivotally attached to a first distal end 78 of the wrist cuff 7 ), and a second wrist strut 83 and second shock loader 87 are pivotally attached to a second (distal end 81 of the wrist cuff 76 for mitigating stress exerted on the robotic hand. The pivotal connection of the first and second distal ends 78 and 81 of the wrist cuff 76 to the respective first and second wrist cuff 79 and 83 allows the palm housing 16 and wrist cuff 76 to bend (pitch) with respect to the forearm second 14 by at least +/−70 degrees. The wrist section thus connects the forearm section to the palm housing and allow for two degrees of freedom of the palm housing relative to the forearm section.

The wrist cuff 76 and palm housing 16 are driven by two wrist actuators 82 that may work together to simultaneously move the palm housing 16 in selected directions having two degrees of freedom defined by the ability of the palm housing to pitch and yaw, as discussed above. Each wrist actuator 82 may be interconnected with a preloaded ball socket 84 in the wrist section 12. A preloaded ball socket 85 is positioned in the palm housing 16 for cooperation with a respective wrist section ball socket 84. A ball joint link 86 interconnects each respective ball socket 84 in the wrist section and ball socket 85 in the palm housing. A wrist strain gauge 88 may be positioned between the ball joint link 86 and the preloaded ball socket 85 for sensing stress between the palm housing 16 End wrist section 12 and providing feedback to control the wrist actuators 82.

The Forearm Section

Figure 4:
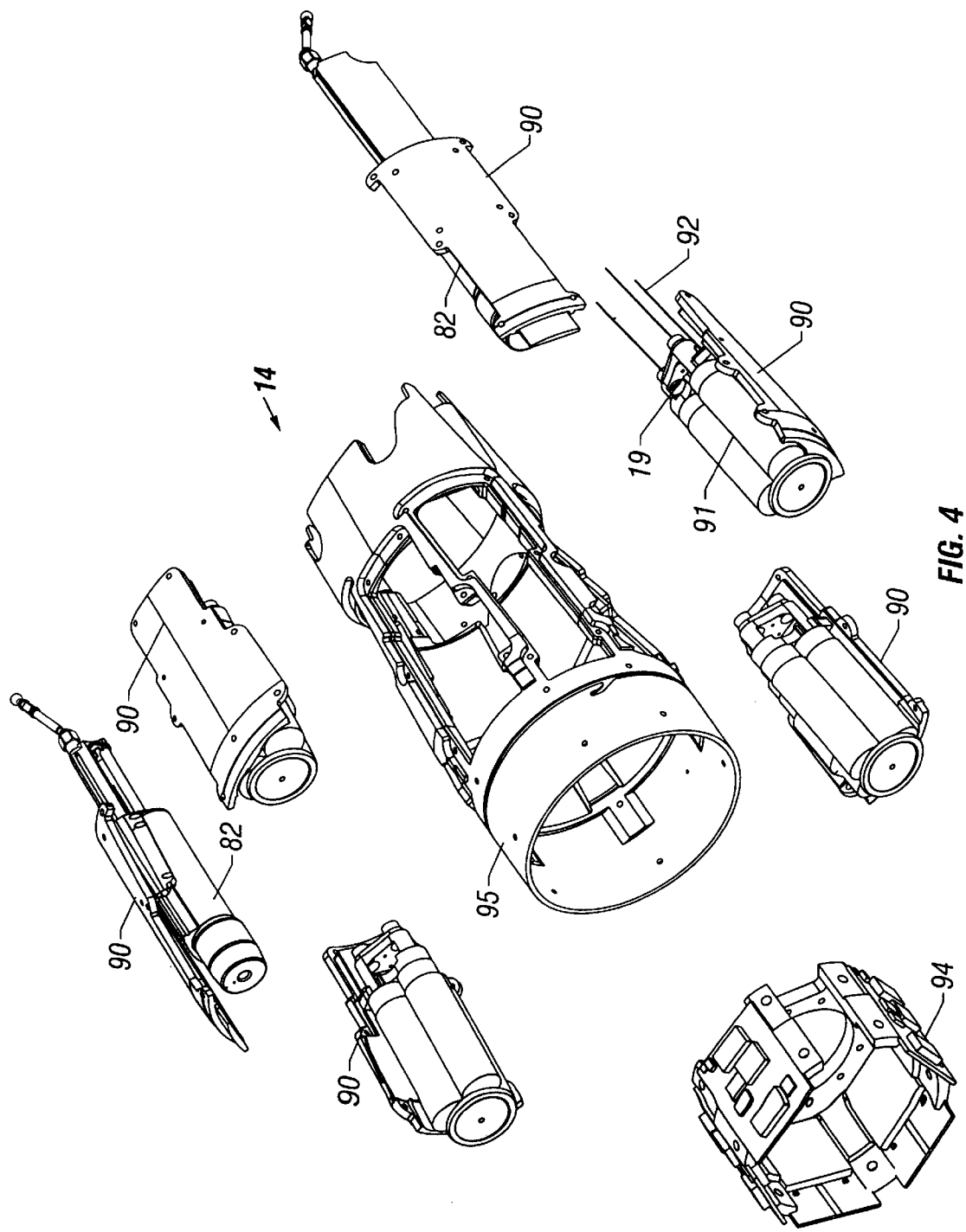
FIG. 4 is an exploded view of the forearm section and actuators.

The forearm section 14 houses all of the rotary actuators 91 and the two linear wrist actuators 82 discussed above in order to conserve space in the palm housing 16 for the lead screw assemblies 54. The forearm section 14 also houses the wrist section shock loaders 80 and 87 discussed above. The forearm section 14 is generally configured as a ribbed shell, as shown in FIG. 4. A plurality of cover plates 90 are designed to act as heat sinks which shield the actuators, circuitry and drive electronics necessary to power the robotic hand l0. In a preferred embodiment, four cover plates 90 are used to mount the twelve actuators 91 that drive the lead screw assemblies 54. Up to three actuators 91 may be attached to a single cover plate 90. A single cover plate 90 may be used to mount a respective wrist actuator 82 that drives the palm housing 16. Each rotary actuator 91 may be a Model 1624 Micro MO brushless motor equipped with an encoder and a fourteen-to-one gear head ratio. An interface assembly 94 may be secured within the distal end 95 of the forearm section 14, and may be used to interface with another robotic device or a stabilizing arm.

A Drive Train

Each actuator 91 (see FIG. 4) forms part of the drive train used to actuate a moveable component of the hand. More particularly, each actuator 91 is operatively connected to the coupling end of a respective lead screw assembly 54 for actuating a respective cable 60 and moving a respective grasping finger 18, dexterous finger 20, thumb 22, or first or second palm members 24 and 25 between an opened and a closed position. Each actuator rotates a flex shaft 92 (see FIG. 4) which passes through the central passageway in the wrist section 12. Each flexible shaft 92 is connected to a respective lead screw assembly 54 which translates rotational movement to linear movement of a respective cable 60. As shown in FIG. 4, there are a total of fourteen actuators, eleven finger actuators, a single palm actuator 91 and two wrist actuators 82. The plurality of flexible shafts or "flex shafts" 92 as shown in FIG. 4 thus each connect a respective actuator 91 with a respective lead screw assembly 54 to minimize space requirements in the palm housing 16. To the extent possible, the length of each flexible shaft 92 is minimized to reduce vibration. Each flexible shaft preferably is manufactured from stainless steel formed to define a tightly wound spring covered with a protective material, such as polytetrafluoraethylene. The rotary actuator for each drive train which cooperates with a lead screw assembly may comprise a brushless motor 91 which rotates a flex shaft.

The plurality of lead screw assemblies 54 are carried by the palm housing 16. Each lead screw assembly 54 includes a short flexible cable 60 having a tubular sleeve 117. A cable 60 may be secured to a respective finger or to one of the first and second palm members 24 and 25 for actuating relative pivotal movement of that member with respect to the palm housing between the opened and closed position. Each lead screw assembly 54 forms part of a "drive train" used to achieve the desired degrees of freedom for a respective finger, palm member or wrist section. The twelve degree of freedom robotic hand 10 requires at least twelve lead screw assemblies 54. Accordingly, each dexterous finger 20 and thumb 22 require at least three lead screw assemblies 54 for enabling movement in directions having at least three degrees of freedom. Likewise, each grasping finger 18 and at least one of the first and second palm members 24 and 25 require at least one lead screw assembly 54 for enabling movement of that respective component in one degree of freedom.

Each linear wrist actuator 82 may comprise a hollow shaft brushless motor which linearly moves a respective ball joint link 86 which is structurally connected to an elongate slider which includes ball tracks. A motor mount for the linear actuators 82 may include corresponding tracks to allow the linear position of the slider to move relative to the motor 82 as the motor is activated. A hollow shaft supported on the slider cooperates with a ball screw nut integral with the motor to linearly move the slider. The slider and motor mount thus effectively eliminate any off-axis load, so that the ball joint link 86 may be interconnected with the slider at a position offset from the axis of the hollow shaft which passes through the motor.

A Lead Screw Assembly

Figure 5:
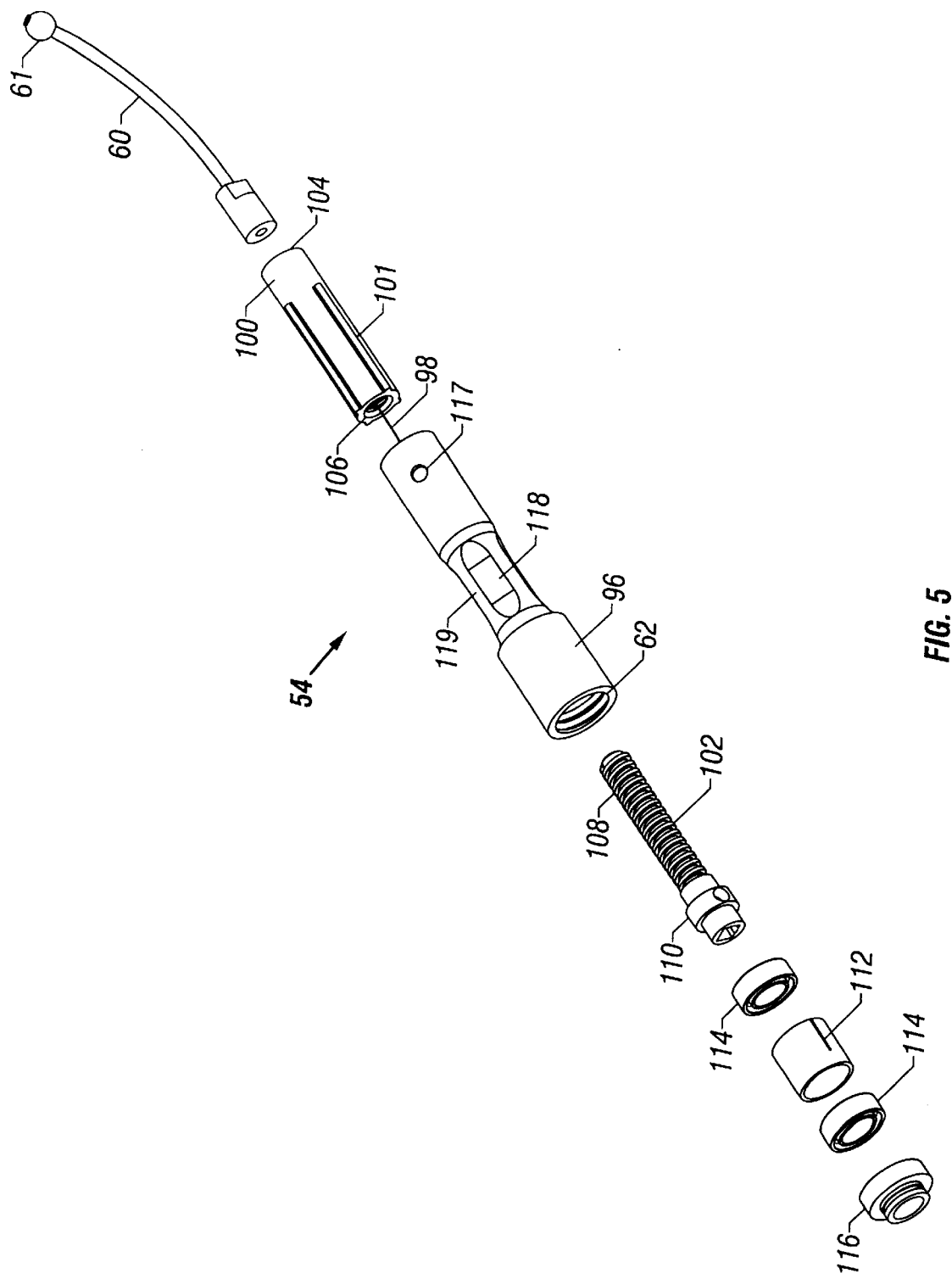
FIG. 5 is an exploded view of one embodiment of a lead screw assembly.

An exploded view of a lead screw assembly 54 is shown in FIG. 5. Twelve lead screw assemblies may be provided in the palm housing, each for achieving one of the respective twelve degrees of freedom for the robotic hand. The lead screw assembly 54 comprises a tubular sleeve 96 in which a body 100 and a lead screw 102 are partially disposed. The body 100 moves relative to the tubular sleeve 96 along a sleeve axis 98 and includes a distal end 104 for interconnection with the cable 60 and a proximal end 106, for interconnection with the body 100. The lead screw 102 includes an end 108 that is threadably connected to the body 100. The lead screw translates rotational movement from the flex shaft 92 to linear movement of the body 100 along the sleeve axis 98. The lead screw 102 includes an opposing end 110 rotatably mounted within the coupling end 62 of sleeve 117. Rotation of the lead screw 102 thus produces linear movement of the body 100 along the sleeve axis 98. The lead screw assembly 54 is capable of translating rotational movement from the coupling end 62 into movement of the cable 60, thereby allowing the robotic hand 10 to be lighter, more compact and capable of grasping heavy objects with the same precision as lighter objects.

The tubular sleeve 96 is designed to act as a load cell and includes internal grooves that mate with two or more exterior rails 101 in order to eliminate off axis loads and enable the body 100 to move along the tubular sleeve axis 98. A spacer 112 and bearings 114 may be positioned between the distal end of the lead screw 110 and the coupling end 62 of the sleeve 117 for improved rotation of the lead screw 102. A connector 116 is used to connect the distal end of the lead screw 110 with the flexible shaft 92 shown in FIG. 4. The upper end of each tubular sleeve 117 is securely clamped to the palm housing 16 so that it will compress under load as the body 100 travels along the sleeve axis 98 toward the coupling end 62. A lead screw strain gauge 119 may be attached to a planar surface 118 of the tubular sleeve 96 for sensing stress on a respective finger as the tubular sleeve 96 compresses. An integral reflective encoder (not shown) may be attached to the distal end of the lead screw 110 for sensing the position of a respective finger.

The Palm

The robotic hand 10 also includes a moveable palm member, which preferably may comprise a first palm member 24 and a second palm member 25. The first and second palm members 24 and 25 are each moveable relative to the palm housing 16 and allow the palm housing 16 to cooperate with the grasping fingers 18 to improve the dexterity and strength of the robotic hand 10 while grasping light or heavy objects. In a less preferred embodiment, a single palm member 24 may be employed.

Each of the first and second palm members 24 and 25 has a first end 26 hingedly connected to the palm housing 16 and a second end 28 for receipt of a respective grasping finger 18. A shield 32 is attached to the palm member 24 for protecting the lead screw assemblies 54. A common shaft 30 hingedly secures the first end 26 of each palm member to the palm housing 16. The common shaft 30 enables each of the hingedly connected first and second palm members 24 and 25 to pivotally move in unison between an opened and closed position. A first torsion spring 21 is positioned between the first and second palm members 24 and 25 and provides a pivoting force between the first and second palm members 24 and 25. A second torsion spring 23 is positioned between the second palm member 25 and the palm housing 16 for biasing the first and second palm members 24 and 25 toward the opened position. The torsion springs may be sized to vary the closure rate between each of the first and second palm members 24 and 25, such that one palm member follows pivoting movement of the other palm member at approximately one-half the angular movement of the other palm member relative to the palm housing 16. The first and second palm members 24 and 25 are therefore each capable of movement in a direction having one degree of freedom defined by the ability of the first and second palm members 24 and 25 to bend (pitch) relative to the palm housing 16 between the opened and closed position.

A shock mount 34 may be positioned between the palm housing 16 and a respective finger for mitigating stress transmitted through the finger when jarred towards the palm housing 16 while the finger is in an opened position or while the finger is loaded in a closed (grasping) position. The base pivot axis of each finger (the pivot axis between the proximal finger segment and the palm housing) is thus desirably not fixed in position relative to the palm housing. The shock mounts 34 increase the tolerance of each respective finger to withstand abnormal and/or excessive loads placed thereon, thus improving the overall durability of the robotic hand 10. Each shock mount 34 is a generally cylindrical member which may be manufactured from a polyethylene material having the requisite elastomeric properties sufficient to absorb abnormal and/or excessive forces exerted on a respective finger. Alternatively, each shock mount 34 may include a preloaded variable spring assembly having the requisite mechanical properties sufficient to absorb similar abnormal and/or excessive forces exerted on a respective finger.

A Grasping Finger

Figure 6:
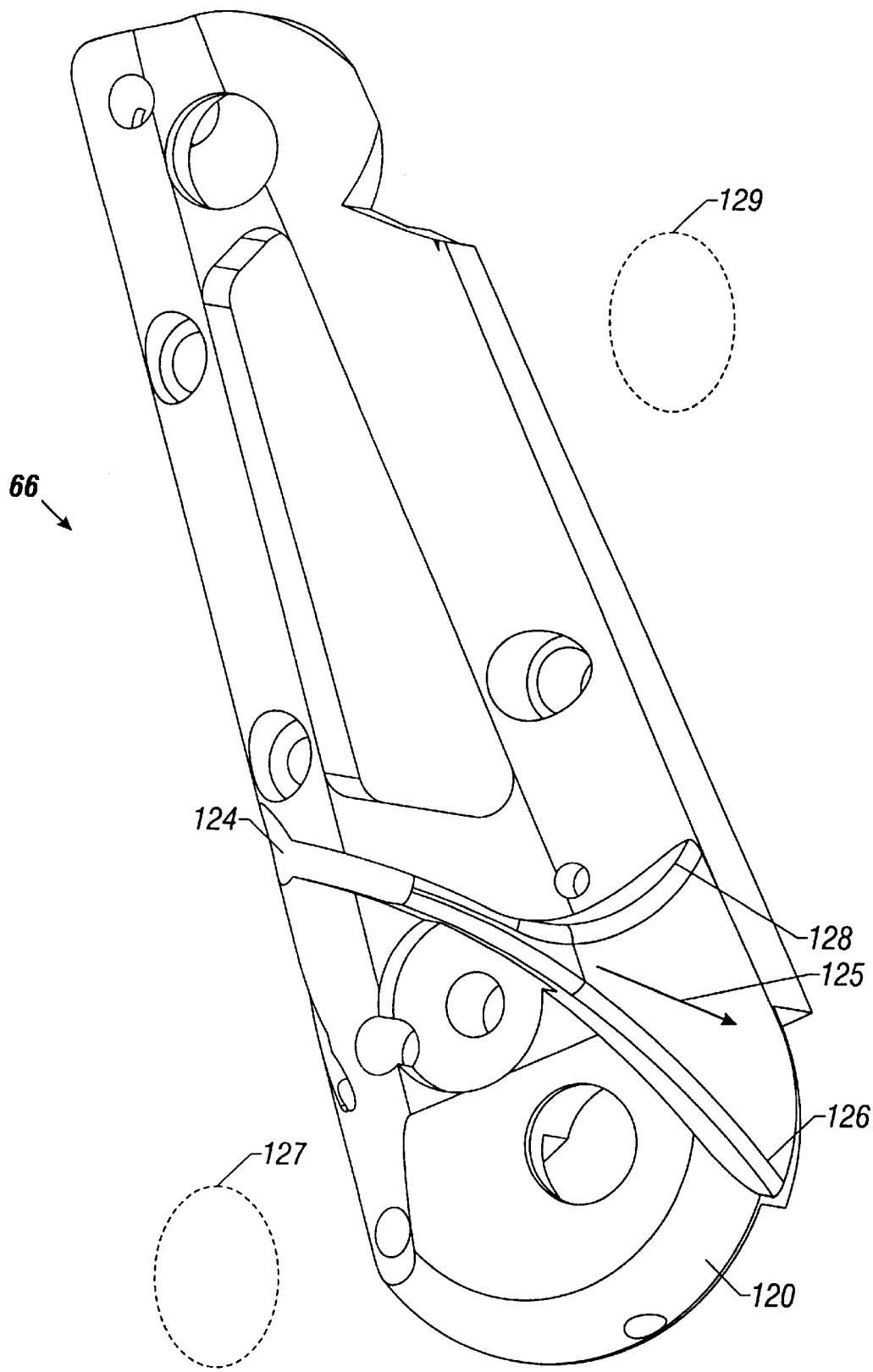
FIG. 6 is a perspective view of the pitch groove and proximal segment of a finger.

In a preferred embodiment, the robotic hand includes two grasping fingers. As seen in FIG. 6, the proximal segment 66 of each finger, including each grasping finger, includes at least one proximal segment half shell 120 and a groove 122 disposed therein. A detent 124 is provided in the top of the half shell 120, which represents the back of the finger. The groove 122 is designed for receipt of a respective cable 60 (see FIG. 5). The cable 60 may accordingly be secured within the groove 122 by positioning the bulbed end 61 of the cable 60 in detent 124 and preferably may be effectively locked into the groove through interference.

The groove 122 defines a first curvilinear cam surface 126 and a second curvilinear surface 128. Each curvilinear cam surface is configured for cooperation with the cable 66 to achieve the purposes explained herein. The first curvilinear cam surface 126 has an instantaneous center generally within an area 127 and the second curvilinear cam surface 128 similarly has instantaneous center generally within an area 129. The second area 128 is opposite the area 127 relative to the first curvilinear surface 126, and the area 129 is opposite the area 127 relative to the second curvilinear surface 128. Accordingly, each cam surface has a length which may be in engagement with the cable 60, and each cam surface comprises short curved surface lengths with each short length having an instantaneous center within its respective area. The series of short curved lengths form each of the cam surfaces 126 and 128.

As the segment 66 is moved by pulling or pushing of the short cable 60, the cable 60 and groove 122 cooperate to actuate pivotal movement of the proximal segment 66 relative to the palm housing 16 as the cable 60 traverses the first curvilinear cam surface 126 or the second curvilinear cam surface 128 of the groove 122. The first and second curvilinear cam surfaces 126 and 128 each define a surface that effectively maintains a large bend radius in the cable while the cable 60 traverses the first and/or second curvilinear cam surface 126 or 128, simultaneously causing pivotal movement of the proximal segment 66. More particularly, the surfaces 126 and 128 each have instantaneous radii of curvature which engage the cable 60 which are at least 30 times, and preferably at least 40 times, the diameter of the cable 60 to minimize kinking of the cable. The surfaces 126 and 128 of each groove 122 thus maintain a substantially larger controlled bend radius in the cable 60 than prior art devices which use pulleys to engage a cable. Moreover, the cable 60 secured within a respective groove 122 may be kept relatively short to reduce cable fatigue. The large bend radius of the cable provided by the first and second curvilinear cam surfaces 126 and 128 also reduces wear on the cable, which as noted has a short length which contributes to its high reliability due to its short length and the effective elimination of the kinks along the length of the cable 60. The length of each cable 60 is reduced such that the cable ideally cannot loop back on itself, regardless of the position of the finger. The short length of the cable and the relatively long length of the cam surfaces 126 and 128 relative to the length of the cable also result in a high percentage of the cable being supported or in engagement with a cam surface when the finger is in the straightened or fully opened position or is in the grasping or fully closed position.

The curvilinear cam surfaces 126 and 128 also are preferably configured so that the cable 60 maintains a constant lever arm on the proximal segment 66 as the cable is pulled to pivot the proximal segment about the axis 203 (see FIG. 13) to move the proximal segment 66 to a more closed or grasping position. In other words, surface 126 is configured so that the spacing between the cable 60 at the point of its engagement with the surface 128 and the axis 203 remains constant. Similarly, the surface 126 is configured so that as the cable is pushed to rotate the proximal segment 66 of the finger toward a more open position by rotating the segment about the axis 203, a substantially constant lever arm exists between that axis and the surface 126 at the point where the cable contacts the surface 126. Moreover, the thickness of the cable and the spacing between the cam surfaces 126 and 128 is effectively such that the constant lever arm is maintained by the movement of the cable 60 acting on the proximal segment 66 of the finger whether the cable is being pulled to move the proximal segment to a more closed position or is being pushed to rotate the proximal segment 66 to a more open position. By maintaining this constant lever arm, a direct relationship exists between rotation of the actuator motor and thus the flex shaft and the arcuate bend which results in the proximal segment 66 moving relative to the palm housing. This feature thus substantially simplifies the controls necessary to cause a predetermined movement of a finger proximal segment.

The proximal segment 66 of a finger may thus be moved by actuating one of the motors in the forearm section which, as a result of the lead screw assembly shown in FIG. 5, results in a predetermined substantially linear movement of the cable 60 relative to the palm housing. As the cable 60 moves, its point of contact with one of the cam surfaces 126 and 128 changes, but the lever arm acting on the proximal segment of the finger remains unchanged. Depending on the thickness of the cable relative to the spacing between the cam surfaces adjacent the detent 124, those skilled in the art will appreciate that there may be one position of the proximal segment 66 relative to the palm housing where the cable 60 contacts neither or both of the cam surfaces 126 and 128, but again the lever arm at this position also remains substantially constant. The predetermined pull length on the cable 60 thus results in a predetermined change in the pivotal position of the proximal segment 66 relative to its former position, and a predetermined push on the cable would similarly result in a predetermined change in the arcuate position of the proximal segment 66 relative to the palm housing as the finger is moved toward a more straightened or open position. In an alternative embodiment, the curvature of each of the cam surfaces 126 and 128 may be varied so that the lever arm acting on the proximal segment 66 is changed as a function of the point at which the cable 60 engages either of the cam surfaces, and thus the lever arm length is a function of the pivotal position of that proximal segment relative to the palm housing. As suggested above, this design would complicate the control of the robotic hand, but this feature could be used to positively affect the structure and operation of the robotic hand.

Since each cable 60 is kept relatively short and its bend radius is controlled by a respective groove 122, the cable 60 also acts like a stiff rod when the proximal segment is in the closed direction to bias the proximal segment towards the opened position. In other words, the ratio of the cable length to its diameter is such that the cable 60 maintains a minimum rigidity that biases the finger towards the opened position when the cable 60 contacts the first curvilinear surface 126 or the first and second curvilinear surfaces 126 and 128 when the finger is fully closed. The surfaces 126 and 128 thus cooperate so that one or both surfaces normally engage the cable, and continually prevent a sharp bend in the cable 60. Similarly, the rigidity of the cable 60 biases the finger towards the closed position when the cable contacts the second curvilinear surface 128 or the first and second curvilinear surfaces 126 and 128. The ratio of the cable length to its diameter thus allows the cable 60 to maintain a desired bias on the finger so that the finger naturally moves back toward a predetermined and substantially open finger position. The use of short flexible cables instead of pulleys and/or complex gears to move the position of each finger relative to the palm housing reduces the size and complexity of each finger while also permitting each finger to be compliant in the non-working direction.

Figure 7:
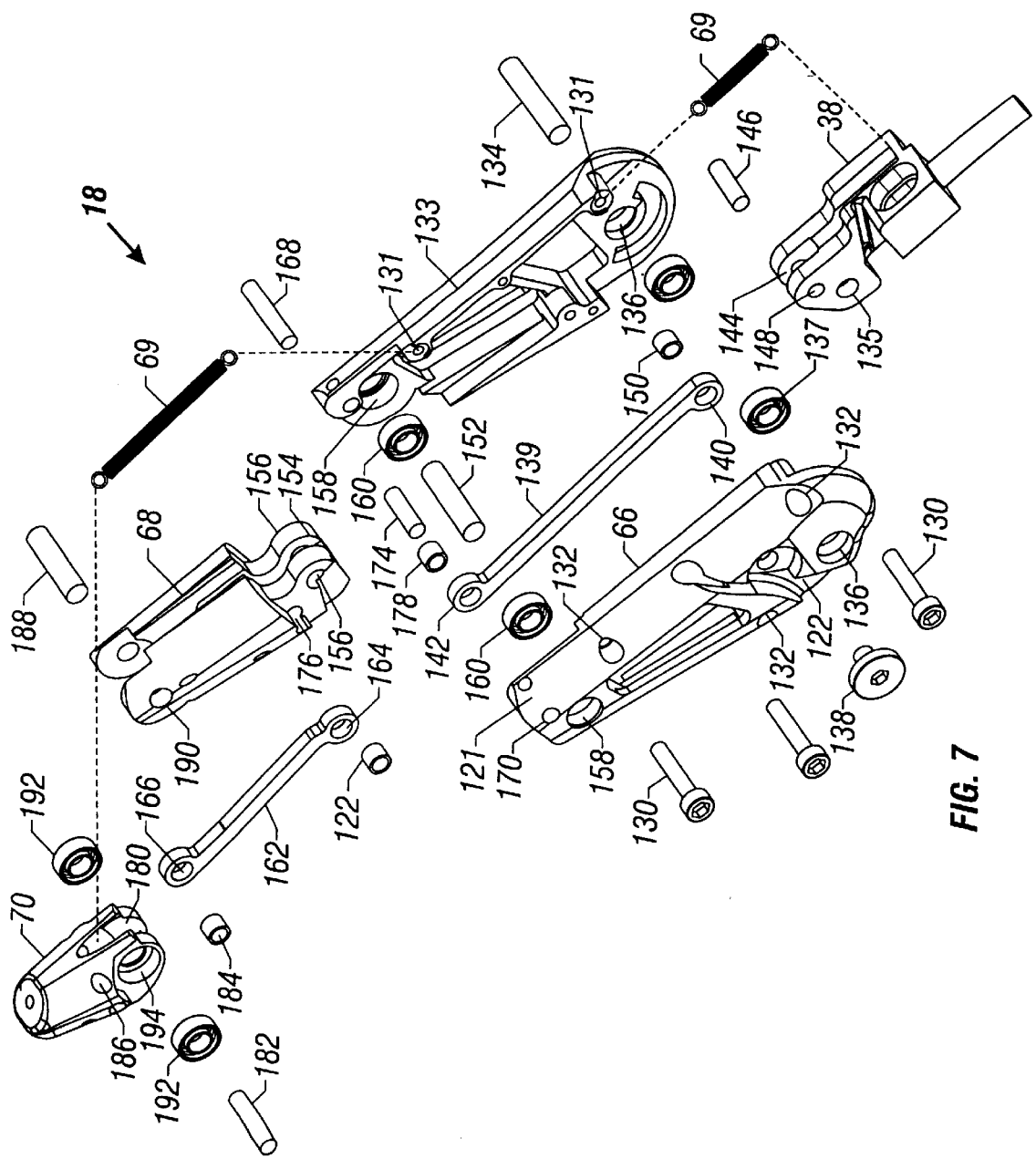
FIG. 7 is an exploded view of the components comprising a grasping finger.
Figure 8:
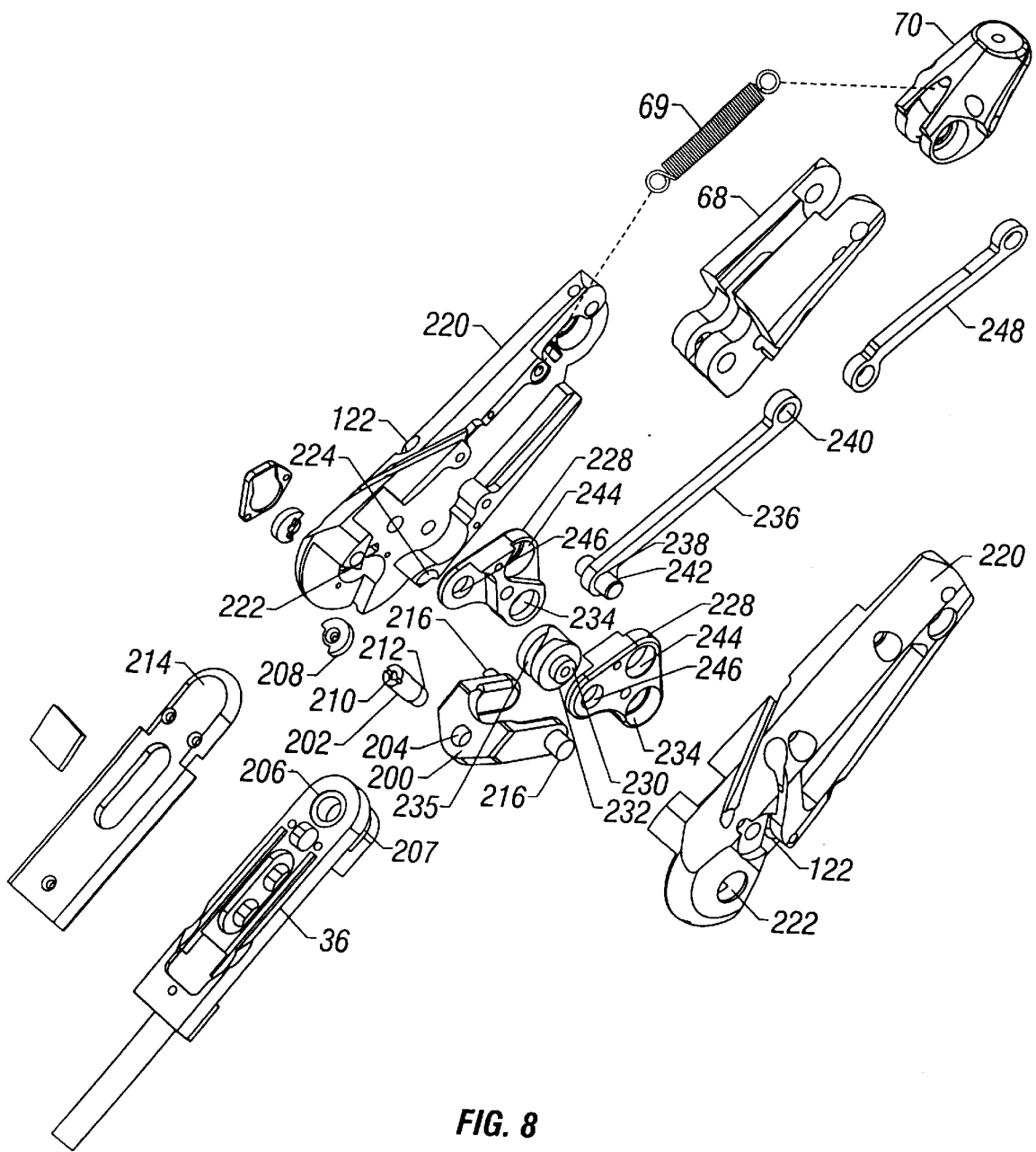
FIG. 8 is an exploded view of the components comprising a dexterous finger.

In a preferred embodiment, the components comprising the grasping finger 18 in a preferred embodiment are shown in FIG. 7 and include two proximal segment half shells 121 and 133, and a groove 122 disposed in at least one of the two proximal segment half shells 121 and 133. This groove 122 exhibits the features discussed above in reference to the groove shown in FIG. 6.

A plurality of apertures 132 are disposed through the proximal segment half shell 121 for receipt of a plurality of respective bolts 130 that are secured within a respective plurality of apertures 131 in the proximal segment half shell 133. A rod 134 passes through an aperture 135 in the grasping finger mount 38 and a respective aperture 136 in each half shell 121 and 133 to secure the proximal segment to the grasping finger mount 38. A cap 138 secures the rod 134 and cable 60 in place. A first link 139 includes a first distal aperture 140 and a second distal aperture 142. The first distal aperture 140 fits within slotted opening 144 of the grasping finger mount 38 and is secured by a pin 146 that passes through a bushing 150, through the first distal aperture 140 and then through an aperture 148 in each side of the grasping finger mount 38.

The intermediate segment 68 of each grasping finger preferably is an integral segment having a slotted opening 154 therethrough. The intermediate segment 68 is hingedly connected to the proximal segment half shells 121 and 133 by a rod 152 which passes through apertures 156 in the intermediate segment 68 and corresponding apertures 158 in each proximal segment half shell 121 and 133. One or more bearings 160 are positioned between each proximate segment half shell 121 and 133 and the intermediate segment 68 in order to facilitate pivotal movement between the intermediate segment 68 and the proximal segment 66. The first link 139 functions to pivot or rotate the intermediate segment 68 a predetermined amount relative to the proximal segment 66 as the proximal segment 66 rotates or pivots relative to the palm housing 16.

A second link 162 includes a first distal aperture 164 and a second distal aperture 166. The second link 162 is connected to the proximal segment half shells 121 and 133 by a rod 168. The rod 168 passes through an aperture 170 in each proximal segment half shell 121 and 133, through the first distal aperture 164 and then through bushing 172. The second distal aperture 142 of the first link 139 is positioned within the slotted opening 154 and is secured to the intermediate segment 68 by a rod 174 which passes through aperture 176 in the intermediate segment 68 and bushing 178. The second link 162 may be replaced with a stiff spring (not shown) in order to make the finger more compliant.

The distal segment 70 is preferably also an integral segment having a slotted opening 180 therethrough. The distal segment 70 is hingedly connected to the intermediate segment 68 by a rod 188 which passes through an opening 190 in the intermediate segment 68, through bearings 192 and then through an opening 194 in the distal segment 70. Thus, openings 194 in the distal segment 70 are aligned between openings 190 in the intermediate segment 68. The second link 162 is positioned within slotted opening 180 such that the second distal aperture 166 may be attached to the distal segment 70 by a pin 182 which passes through bushing 184, the second distal aperture 166 and aperture 186 through the distal segment 70. The second link 162 acts on and controls the distal segment 70, so that the distal segment also moves relative to the intermediate segment 68 as a predetermined function of the movement of the intermediate segment 68 relative to the palm housing 16.

The manner in which the proximal segment 66, intermediate segment 68 and distal segment 70 are pivotally linked to the grasping finger mount 38 by the first and second link 139 and 162 enables each finger segment to simultaneously bend in the same direction and in equal proportion relative to the member which supports its pivotal movement. Each grasping finger segment may thus rotate through an arc of up to at least 90 degrees relative to a respective adjoining segment or palm housing. The cable 60, groove 122 and pivotally linked segments cooperate to enable pivotal movement of a respective grasping finger 18 in directions having at least one degree of freedom defined by the ability of the pivotally linked segments to bend (pitch) relative to the palm housing 16 between the opened and closed positioned. Because the grasping finger proximal segment 66, intermediate segment 68 and distal segment 70 may simultaneously bend in equal proportion (equal bend relative to its supporting member), a single actuator 91 and lead screw assembly 54 may be used to drive the one degree of freedom grasping finger 18. A tension spring 69 (see FIG. 2) may be used to connect the distal segment 70 and the intermediate segment 68 on a respective grasping finger 18 to maintain a biasing force on these finger segments to eliminate or minimize backlash. Other biasing springs may be used to achieve a biasing force on any of the finger segments, if desired.

A Dexterous Finger

In FIGS. 8, 9A, 9B, 10A and 10B, various positions of a dexterous finger 20 are shown. The dexterous finger resembles the grasping finger described in reference to FIG. 7, except that the dextrous finger mount 36 is modified to enable movement of the dexterous finger 20 in directions having an additional two degrees of freedom as discussed below. The movement of the proximal segment of a dexterous finger thus does not control movement of the intermediate and distal segments, and the dexterous finger has yaw movement relative to the palm housing which is not provided for in the grasping fingers.

Figure 13:
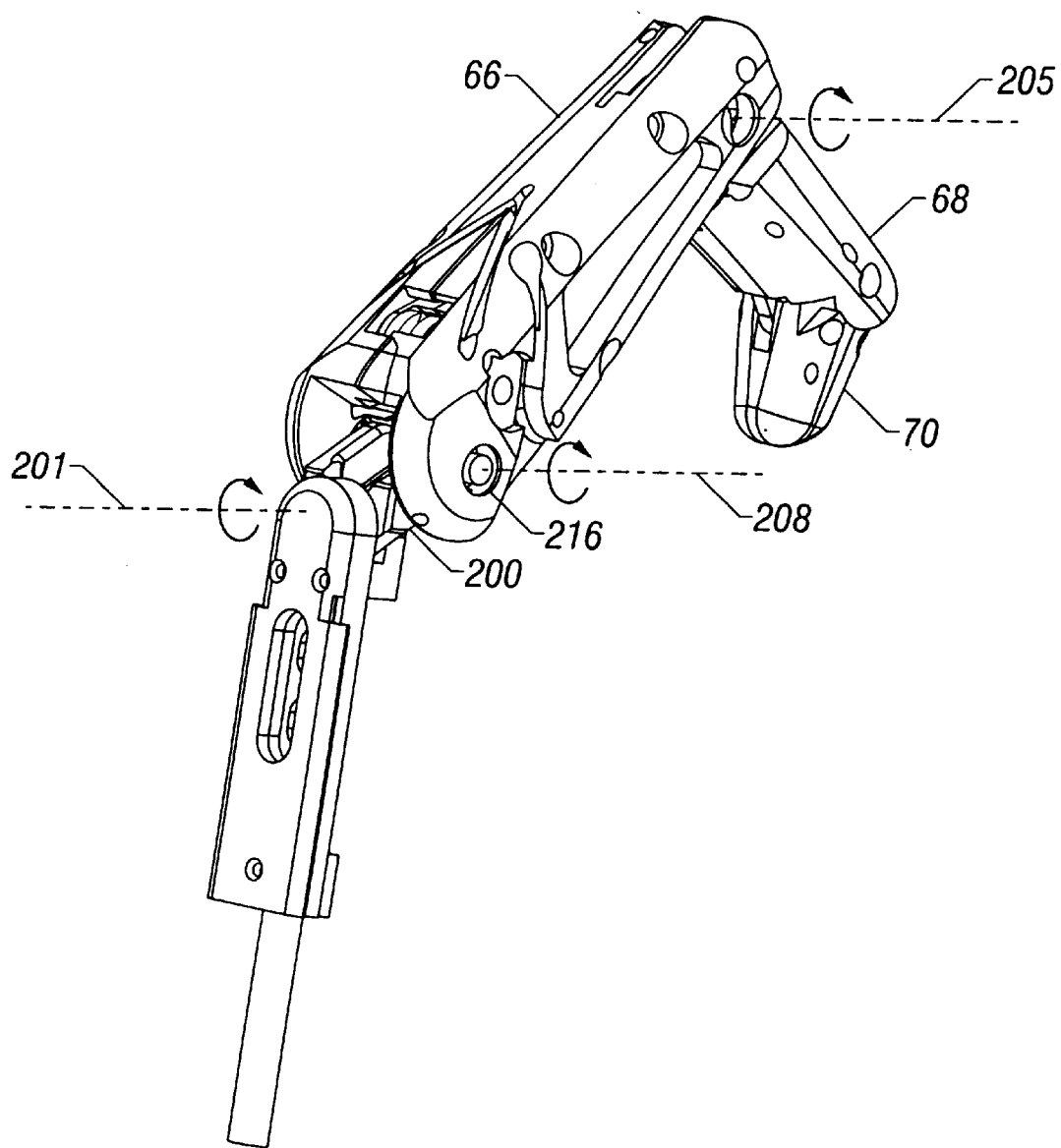
FIG. 13 is a perspective view of a dexterous finger housing the axes of rotation for each degree of freedom.

The dexterous finger mount 36 is modified relative to the grasping finger to receive a pivoting yoke 200. A sensor disk or cap 208 is threadably attached to a top end 210 of the pin 202. The yoke 200 is secured with pin 202 to the dexterous finger mount 36. A plate 214 is secured on top of the dexterous finger mount 36 to prevent the threaded cap 208 from backing out. The yoke 200 includes a pair of pivot arms 216. Each pivot arm 216 is attached to a respective proximal segment half shell 220 through aperture 222, thereby permitting the yoke 200 to pivot about an axis of rotation 203 as shown in FIG. 13, causing the proximal segment 66 to bend (pitch) relative to the palm housing. The yoke is positioned in slotted opening 207 of the dexterous finger mount 36 and enables lateral or yaw movement of the proximal segment 66. This movement controls the space between the controlled dexterous fingers 20 and an adjacent finger to be opened and closed simultaneously with the pitch or bending movement of that dexterous finger 20. A pin 202 is positioned through an opening 206 in the dexterous finger mount 36 and is press fitted within opening 204 in the yoke 200 to enable the yoke 200 to pivot about an axis of a rotation 201 as shown in FIG. 13, causing the proximal segment 66 to move laterally (yaw) relative to the palm housing 16.

Each of the proximal segment half shells 220 includes a groove 122 disposed therein for receipt of a respective cable 60. Each groove 122 may be configured to serve the same function as discussed in reference to the groove in FIG. 6. The cable 60 is driven by a respective actuator 91 and lead screw assembly 54 as discussed in reference to FIGS. 4 and 5. The two grooves 122 provided in the proximal segment of each dexterous finger are spaced on opposing sides of a centerline for the yoke 200 (and thus on opposing sides of a centerline for the proximal segment), so that this off-axis connection of the cable with the proximal segment allows the simultaneous pitch and yaw of the dexterous finger. A cable 60 secured within a groove 122 in each of the two proximal segment half shells 220 and the yoke 200 thus cooperate to enable both simultaneous yaw or lateral and pitch or bending movement of the proximal segment 66. Pitch only movement may be achieved by the simultaneous and equal actuation of the two cables each within a respective one of the grooves 122. Lateral or yaw motion only may be achieved by pulling on one cable and pushing on the other cable so that no pitch or bending of the finger is obtained. In most cases, both pitch and bending of the dexterous finger proximal segment will be obtained by simultaneous but unequal movement of the two cables which cooperate in a differential manner to achieve both pitch and yaw. The yoke 200, the grooves 122 and the cables 60 enable movement of the proximal segment 66 of a respective dexterous finger 20 in directions having at least two degrees of freedom defined by the ability of the proximal segment 66 to bend (pitch) relative to the palm housing 16 up to at least 100 degrees and move laterally (yaw) to vary the spacing between that dexterous fingers 20 and an adjacent finger by at least +/−25 degrees. The use of short flexible cables 60 instead of pulleys and/or complex gears eliminates the significant number of joints that would otherwise be needed to enable movement of the proximal segment 66 in directions having these two degrees of freedom.

A decoupling 228 including mating halves is positioned between each dexterous finger proximal segment half shell 220. As described in further detail below, the intermediate and distal segment 68 and 70 of a dexterous finger 20 are pivotally linked to the mating halves of the decoupling assembly 228 in order that the intermediate and distal segment 68 and 70 may bend or pivot in a pitch direction relative to the proximal finger segment and independent of the position of the proximal segment 66 relative to the palm housing 16. Thus, the mating halves of the decoupling assembly 228, which is pivotally supported on the proximal segment, cooperate to decouple or separate movement of the intermediate and distal segment 68 and 70 from movement the proximal segment 66 on a respective dextrous finger 20.

Figure 9A:
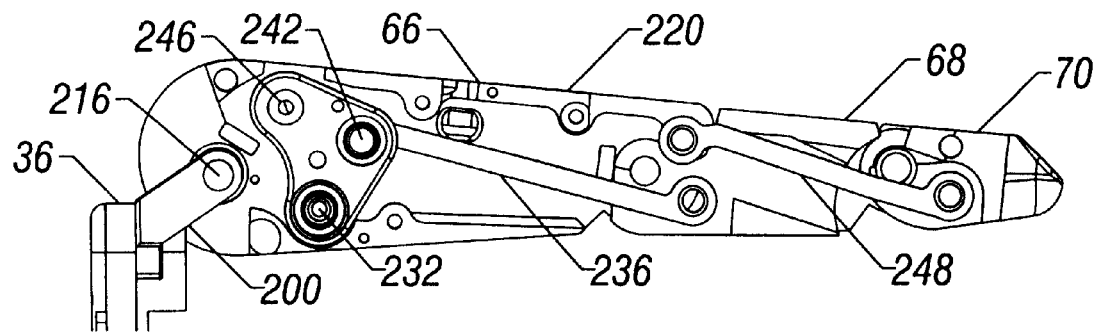
FIG. 9A is a cut-away side view of a dexterous finger and decoupling assembly with the dexterous fingers in a partially closed position.
Figure 9B:
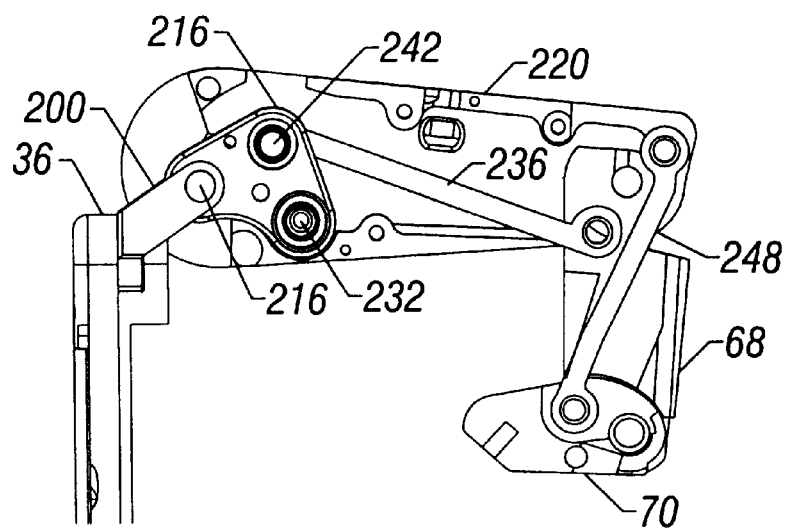
FIG. 9B is a cut-away side view of a dexterous finger and decoupling assembly with the dexterous finger in a fully closed position.

A shaft 230 is positioned between the mating halves of the decoupling assembly 228. A shaft arm 232 on each side of the shaft 230 extends through a respective aperture 234 in the mating halves of the decoupling assembly 228. Each shaft arm 232 is pivotally secured within an opening 224 in a respective proximal segment half shell 220, and thus forms a pivot point about which the mating halves of the decoupling assembly 228, as seen in FIGS. 9A–9B, may pivot. A first link 236 includes a first distal aperture 238 and a second distal aperture 240. A pin 242 passes through the first distal aperture 238 and is pivotally secured within opening 244 of the mating halves of the decoupling assembly 228. The first link 236 is pivotally secured between the mating halves of the decoupling assembly 228. The decoupling assembly 228 is pivotally supported on the proximal segment of the dexterous finger and thus pivots with respect thereto about one axis, i.e., the axis of shaft arm 232. A first link 236 is pivotally connected to the decoupling assembly 228 at a second point, i.e., pin 242, and a cable 60 is connected thereto at a third point, i.e., pin 246, as discussed below. The remaining linkage between the proximal segment 66, the intermediate segment 68 and the distal segment 70 utilizes a first link 236 and second link 248 similar to the linkage between segments on the grasping finger 18, as shown in FIG. 7. The second link 248 may alternatively be replaced with a stiff spring, so that the finger may be more compliant.

Figure 10A:
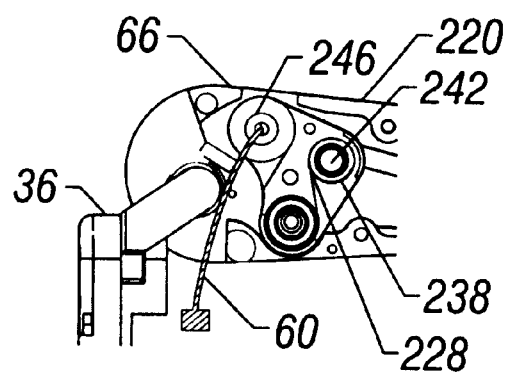
FIG. 10A is a cut-away partial side view of the dexterous finger proximal segment in a closed position.
Figure 10B:
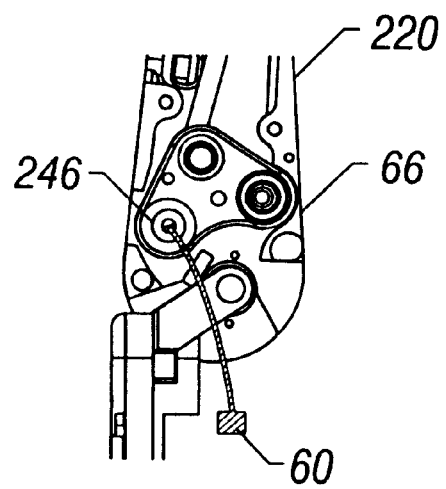
FIG. 10B is a cut-away partial side view of the dexterous finger proximal segment in an opened position.

A cable 60 is pivotally secured to the mating halves of the triangular-shaped decoupling assembly 228 between each aperture 246, as generally shown in FIGS. 10A and 10B, and is driven by a respective actuator 91 and a lead screw assembly 54 as discussed above in reference to FIGS. 4 and 5. The axis of pin 246 in the decoupling assembly 228 is selected so that the arc length of the cable 60 remains constant regardless of the position of the proximal segment 66, which may move as shown in FIGS. 10A and 10B from a straight to a bent position. The position of the pin 246 is thus selected so that this cable length remains constant, thereby not effecting movement of the intermediate and distal segments during movement of the proximal finger segment. The linkages between the decoupling assembly 228, the intermediate segment 68 and the distal segment 70 permit pivotal bending or pitch movement of the proximal segment 66 without moving the intermediate and distal segment 68 and 70. Conversely, the intermediate and distal segment 68 and 70 may pivotally bend or pivot in the same direction and in equal proportion relative to their respective supporting segment without moving the proximal segment 66 when the decoupling assembly 228 is actuated by the cable 60.

The cable 60, the decoupling assembly 228 and pivotally linked segments on a respective dexterous finger 20 cooperate to enable pivot movement of the intermediate and distal segment 68 and 70 in a direction having a third degree of freedom from the proximal segment pitch and yaw degrees of freedom discussed above. This third degree of freedom allows the intermediate and distal segment 68 and 70 to simultaneously bend (pitch) relative to and independent of movement of the proximal segment 66. Each respective dexterous finger 20 is thus preferably capable of movement in directions having at least three degrees of freedom defined by the ability of the proximal segment 66 to yaw and pitch about axes of rotation 201 and 203, respectively, and the independent ability of the intermediate and distal segment 68 and 70 to pitch about an axis of rotation 205 as seen in FIG. 13 relative to the proximal segment 66.

As seen in FIG. 2, a tension spring 69 may be used to connect the distal segment 70 and the intermediate segment 68 on a respective dexterous finger 20 to maintain a biasing force on these segments toward the finger open or extended position. Similarly, one or more tension springs 69 may be used to connect the proximal segment 66 on a respective dexterous finger 20 to the palm housing 16 to maintain a similar biasing force on the dexterous finger proximal segment 66. The rigidity of the cable 60 within the groove 122 may also bias the proximal finger segment as discussed above.

The Thumb

Figure 11:
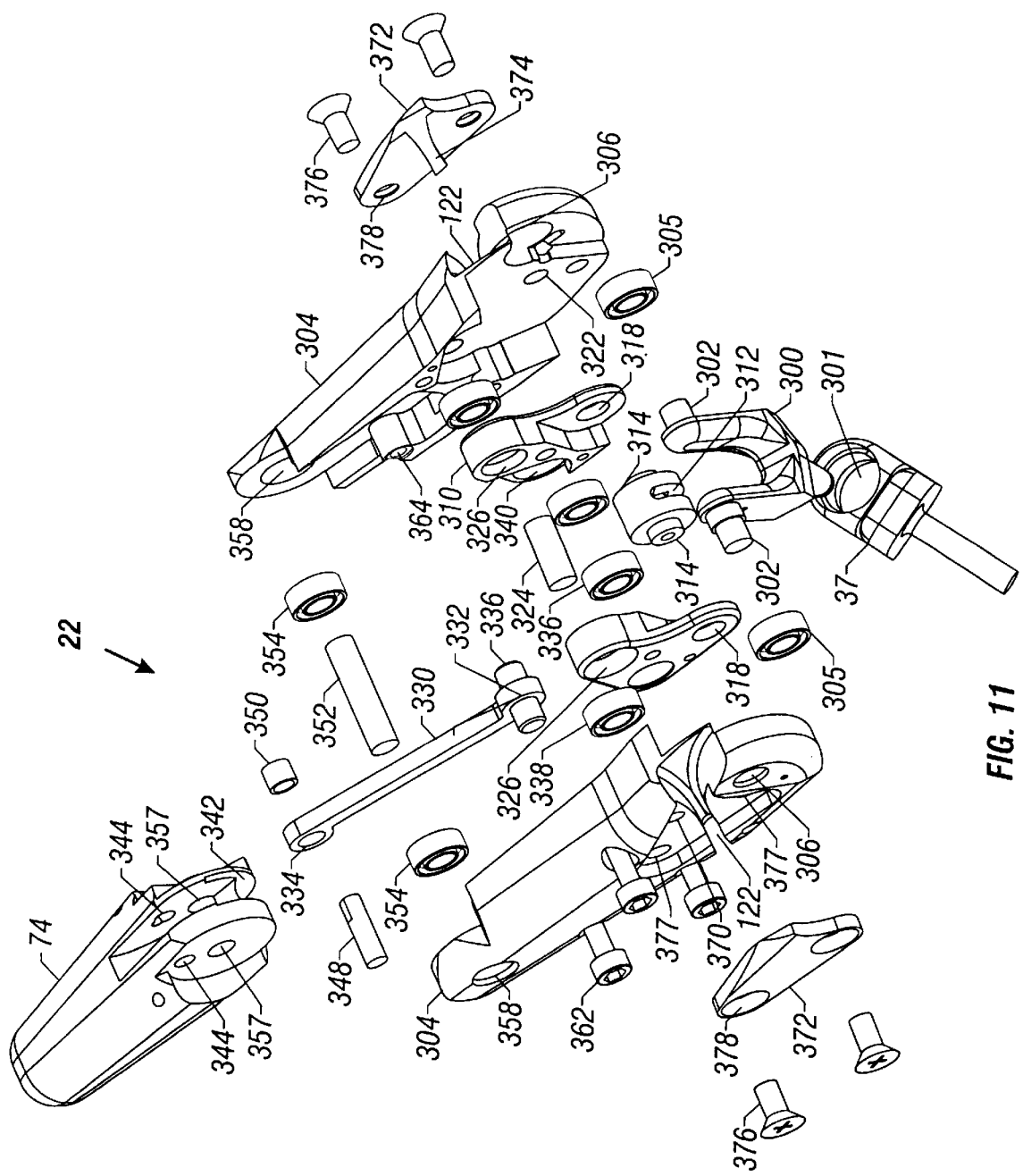
FIG. 11 is an exploded view of the components comprising the thumb.
Figure 12:
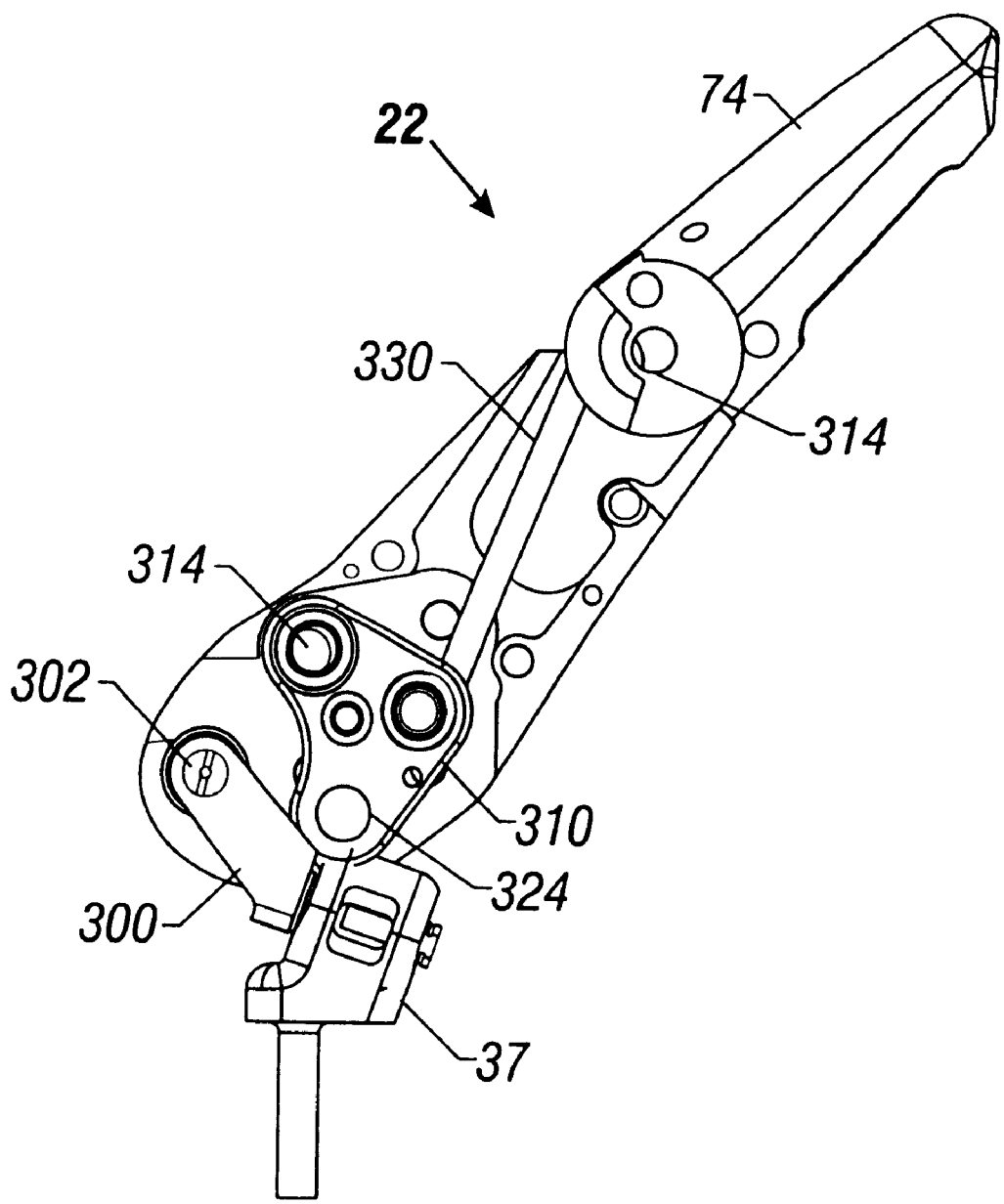
FIG. 12 is a cut-away side view of the thumb and decoupling assembly in an opened position.

Referring now to FIGS. 11 and 12, the dexterous thumb 22 is shown. As used herein, the term "finger" includes reference to the thumb. The thumb 22 is positioned opposite the one or more grasping fingers 18 relative to the one or more dexterous fingers 20 and assists in the manipulation of light or heavy objects held in the robotic hand 10. The components comprising the dexterous thumb 22 are essentially the same as those comprising the dexterous finger 20 discussed above, with the exception of a missing intermediate segment and corresponding linkage. The thumb 22 and dexterous finger 20 are also functionally similar in operation and degrees of freedom, as discussed below. The thumb 22 is skewed or offset from the plane of the palm housing for opposing the dexterous fingers. The preferred offset of the skewed thumb relative to the palm housing is a function of the length of the thumb, its position relative to the palm housing, and the operations to be performed by the robotic hand 10.

Figure 14:
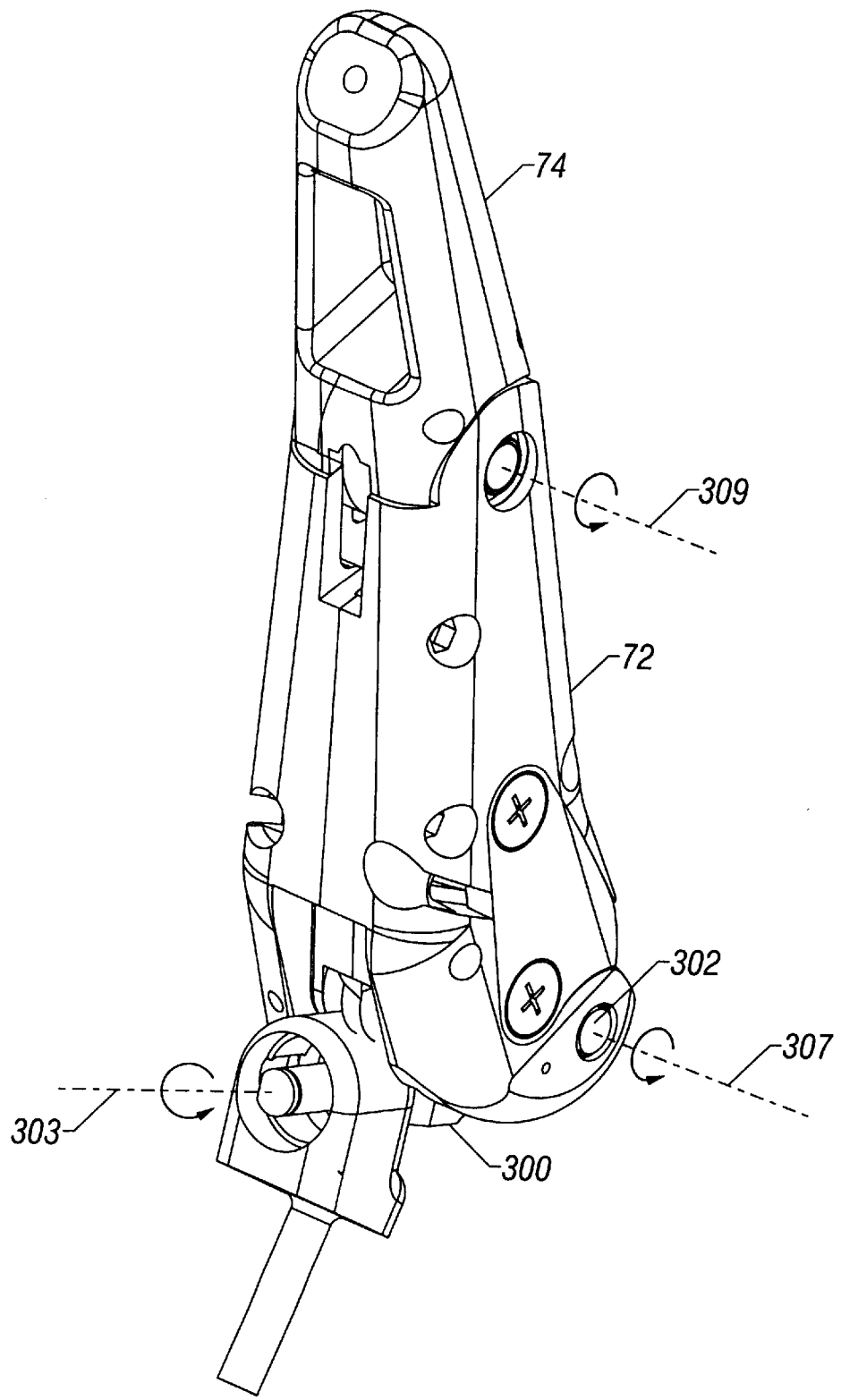
FIG. 14 is a perspective view of the thumb and its axes of rotation for each degree of freedom.

The thumb 22 includes a yoke 300 pivotally secured within aperture 301 in the thumb mount 37. The yoke 300 pivots about an axis of rotation 303 relative to the palm housing as shown in FIG. 14, causing the proximal segment 72 of the thumb to move laterally (yaw). The yoke 300 also includes a pair of pivot arms 302. Each pivot arm 302 is positioned through a respective bearing 305 and is pivotally secured with aperture 306 in a respective proximal segment half shell 304. Thus, the yoke 300 also pivots about an axis of rotation 307, as shown in FIG. 14, causing the proximal segment 72 to bend (pitch) relative to the palm housing.

Each proximal segment half segment shell 304 includes a groove 122 disposed therein for receipt of a respective cable 60. The thumb grooves 122 preferably exhibit the same features as discussed above for the grooves shown in FIG. 6. A cable 60 cooperates with each of the pair of spaced apart thumb grooves 122 and is driven by a respective actuator 91 and lead screw assembly 54, as discussed above in reference to FIGS. 4 and 5. A pair of cables 60 thus cooperate to enable simultaneous lateral or yaw and bending or pitch movement of the proximal segment 72 of the thumb 22. The proximal segment 72 of the thumb 22 may thus be moveably controlled in directions having at least two degrees of freedom defined the ability of the proximal segment 72 both to bend (pitch) relative to the palm housing 16 up to at least 110 degrees and to laterally alter the spacing in a yaw direction relative to the palm housing up to at 100 degrees.

In order to maintain a large bend radius of the cable 60 within each groove 122 at extreme lateral or yaw angles for movement of the thumb 22, a detent 370 is formed in each proximal segment half shell 304. The cable 60 is secured within the groove 122 by a plate 372 which fits within detent 370. The inside of each plate 372 includes a corresponding groove 374 which is essentially a mirror image of the groove 122. Each plate 372 is secured to a respective proximal segment half shell 304 by a plurality of screws 376 which each pass through one of a plurality of respective apertures 378 in a respective plate 372. Each screw 376 is threadably secured within a respective aperture 377 in the proximal segment half shell 304.

The thumb 22 may be moved laterally relative to the palm housing in a much larger yaw direction than the yaw provided for the dexterous fingers. This significantly larger yaw for the thumb is desired in order to allow the thumb to be selectively positioned to oppose either of the dexterous fingers, or to oppose either of the grasping fingers. This larger yaw complicates the mechanism for achieving pitch of the proximal segment of the thumb. Although pitch movement of the thumb is functionally achieved in a manner similar to pitch movement of the dexterous fingers, as discussed above, there is coupling between extreme yaw thumb movement and pitch movement of the proximal segment of the thumb. A computer program may thus be used to regulate pitch of the thumb proximal segment in response to rotation of a flex shaft as a function of the yaw position of the thumb.

A rod 352 is used to hingedly connect each thumb proximal segment half shell 304 to the distal segment 74. The rod 352 passes through a pair of apertures 357 in the distal segment 74 and then through a pair of bearings 354. Each end of the rod 352 is pivotally secured within an aperture 358 in a respective proximal segment half shell 304. The proximal segment half shells 304 are secured together by a plurality of bolts 362 which each pass through and are secured within one of a plurality of apertures in the respective proximal segment half shell 304.

A shaft 312 includes a shaft arm 314 that extends through a respective aperture 318 in the mating halves of decoupling assembly 310. Each shaft arm 314 is pivotally secured to a respective proximal segment half shell 304 and forms a pivot point about which the mating halves of the decoupling assembly 310, as seen in FIG. 12, may pivot. The decoupling assembly for the thumb is thus structurally and functionally similar to the decoupling assembly discussed above for a dexterous finger. A rod 324 is positioned through aperture 326 in a respective mating halve of the decoupling assembly 310. A cable 60 is pivotally attached to one end of the rod 324 for connecting the mating halves of the decoupling assembly 310, and a similar cable may be attached to the opposing end of the rod 324. The rod 324 and thus the decoupling assembly are moved by cables 60 which in turn is moved by a respective actuator 91 and lead screw assemblies 54, as discussed above.

A link 330 transfers movement from the decoupling assembly 310 to the thumb segment 74. The link 330 includes a first distal aperture 332 and a second distal aperture 334. A pin 336 passes through the first distal aperture 332 and through a plurality of bearings 338, and is pivotally secured within the aperture 340 in the mating halves of the decoupling assembly. The second distal aperture 334 in the link 330 is positioned within slotted opening 342 of the distal segment 74 and is pivotally secured to the distal segment 74 by a pin 348 that passes through bushing 350. The pin 348 is pivotally secured within apertures 344 in the thumb distal segment 74. The distal segment 74 of the thumb 22 is pivotally linked to the mating halves of the decoupling assembly 310 in order that the distal segment 74 bends independent of the thumb proximal segment 72. The mating halves of the decoupling assembly 310 thus cooperate to decouple or separate movement between the distal segment 74 and proximal segment 72 of the thumb 22.

The decoupling assembly 310 for the thumb is preferably positioned closely adjacent the pitch pivot point for the proximal segment of the thumb, just as the decoupling assembly for each of the dexterous fingers is preferably positioned closely adjacent the pitch axis of the proximal segment of the dexterous finger. In view of the substantial yaw movement provided for the thumb, the lever arm for the decoupling assembly 310 of the thumb is not maintained substantially constant for all thumb positions, and accordingly the pitch movement of the distal segment of the thumb may be controlled through the use of computers so that predetermined amount of rotation of an actuator in the forearm section will result in a predetermined movement of the distal segment of the thumb as a function of the pitch and yaw position of the proximal thumb segment. There is thus some coupling between position of the thumb proximal segment and movement of the thumb distal segment due to the extreme range of yaw motion provided by the thumb. That coupling may be handled through the use of thumb proximal segment position sensors and a computer in order to control movement of the thumb distal segment as a function of the position of the thumb proximal segment.

The distal segment 74 can bend up to at least 90 degrees with respect to the proximal segment 72 when the mating halves of the decoupling assembly 310 are actuated by cable 60. The decoupling assembly 310 and the pivotally linked distal segment on the thumb 22 cooperate to enable pivotal movement of the distal segment 74 in directions having a third degree of freedom defined by the ability of the distal segment 74 to independently bend (pitch) relative to the proximal segment 72. The thumb 22 is accordingly capable of moving in directions having at least three degrees of freedom defined by the ability of the proximal segment 72 to yaw and pitch about axes of rotation 303 and 307, respectively, and the separate ability of the distal segment 74 of the thumb to pitch about and axis of rotation 309 as seen in FIG. 14 relative to the proximal segment 72.

A tension spring 69 similar to that shown in FIG. 2 may be used to connect the distal segment 74 and the proximal segment 72 on the thumb 22 to maintain a biasing force on the distal segment 74 toward a thumb open position. Similarly, one or more tension springs may be used to connect the proximal segment 72 on the thumb 22 to the palm housing 16 to maintain a biasing force on the proximal segment 72 toward the open position.

It will be understood by those skilled in the art that the embodiment shown and described are only exemplary and that various modifications may be made in the practice of the invention within the scope of the appended claims. For example, those skilled in the art will appreciate that various types of flexible shafts may be used to mechanically interconnect an actuator with a respective lead screw assembly to result in a predetermined linear movement of a cable as a function of rotation of the actuator. Rather than use a tightly wound spring, a flexible shaft could be formed from a plurality of interconnected U joint mechanisms which are interconnected by simplistic ball and socket mechanisms.

What is claimed is:

1. A dexterous robotic hand, comprising:
   a palm housing;
   a plurality of flexible fingers each movably secured to the palm housing, each finger including a plurality of hingedly connected segments, at least one segment of each finger operatively connected to another segment of the same finger;
   a groove disposed in a proximal segment of each finger, each groove having a first curvilinear cam surface and a second curvilinear cam surface, the first curvilinear cam surface having a first area of curvature and the second curvilinear cam surface having a second area of curvature, the second curvilinear cam surface being opposite the first area of curvature relative to the first curvilinear cam surface and the first curvilinear cam surface being opposite the second area of curvature relative to the second curvilinear cam surface, the proximal segment being pivotally movable with respect to the palm housing such that the finger may move relative to the palm housing in a direction of at least one degree of freedom between an opened and a closed position:

a plurality of lead screw assemblies each supported on the palm housing, each lead screw assembly including a cable end and a coupling end;

a plurality of cables each secured within a respective groove such that the cable contacts the first curvilinear surface to move the flexible finger to a closed position and the cable contacts the second curvilinear surface to move the flexible finger to an open position; and a plurality of finger actuators each operatively connected to a coupling end for actuating a respective cable to move a respective finger between the opened and closed positions.

2. The robotic hand as defined in claim 1, wherein the first and second curvilinear cam surfaces maintain a substantially constant lever arm for moving the respective finger relative to the palm housing in response to movement of a respective cable and independent of the position of the finger respective relative to the palm housing.

3. The robotic hand as defined in claim 1, wherein the cable rigidly biases the respective finger to a selected position when the cable engages one of the first and second cam surfaces.

4. The robotic hand of claim 1, wherein each lead screw assembly comprises:

a tubular sleeve having a sleeve axis;

a body movably mounted at least partially within the tubular sleeve for movement relative to the tubular sleeve along the sleeve axis, the body including a distal end for interconnection with the cable and a proximal end; and a lead screw disposed at least partially within the tubular sleeve, the lead screw having a proximal end threadably connected to the proximal end of the body and a distal end rotatably mounted within the coupling end such that rotation of the lead screw produces movement of the body and at least a portion of the cable along the sleeve axis.

5. The robotic hand of claim 1, further comprising:

a forearm section for housing the plurality of finger actuators;

a wrist cuff pivotally attached to the palm housing and pivotally attached to the forearm section, the wrist cuff having a through opening therein;

a first and a second shock loader each positioned within the forearm section and attached to the wrist cuff for mitigating stress exerted on the hand; and a first and a second wrist actuator each operatively connected to the palm housing for transmitting pivotal movement to the palm housing relative to the forearm section in directions having at least two degrees of freedom defined by the pivotal connection of the wrist cuff to the forearm section and the pivotal connection of the palm housing to the wrist cuff.

6. The robotic hand of claim 5, further comprising:

a plurality of segment sensors each for sensing a relative position of a respective segment of a finger; and a plurality of wrist sensors for sensing a position of the palm housing relative to the forearm section.

7. The robotic hand of claim 5, further comprising:

a plurality of lead screw sensors each attached to a respective one of the plurality of lead screw assemblies for sensing stress on a respective finger upon grasping an object; and a wrist gauge positioned between one of a respective first and second wrist actuator and the palm housing for sensing stress on the palm housing upon grasping an object.

8. The robotic hand of claim 1, further comprising:

a forearm section for housing the plurality of finger actuators;

a wrist cuff pivotally attached to the palm housing and pivotally attached to the forearm section, the wrist cuff having a through opening therein; and a plurality of flexible shafts each passing through the through opening in the wrist cuff and having a first end connected to a respective finger actuator and a second end connected to a respective coupling end of a lead screw assembly for transmitting rotational movement from a respective finger actuator to a respective lead screw assembly.

9. The robotic hand of claim 1, wherein the plurality of flexible fingers comprises:

a dexterous finger, a grasping finger and a thumb each movably secured to the palm housing;

the grasping finger being positioned opposite the thumb relative to the dexterous finger; and the thumb being pivotally connected to the palm housing at a position spaced from a plane of the pivotal connection of the dexterous finger and the grasping finger with the palm housing.

10. The robotic hand of claim 9, wherein the plurality of hingedly connected segments on the grasping finger comprises:

the proximal segment, an intermediate segment and a distal segment, the proximal, intermediate and distal segments being pivotally linked such that the intermediate and distal segments simultaneously bend as a function of the bending of the proximal segment.

11. The robotic hand of claim 9, wherein the plurality of hingedly connected segments on the dexterous finger comprises:

the proximal segment, an intermediate segment and a distal segment, the intermediate segment being pivotally linked to a decoupling assembly such that the intermediate and distal segment bend independent of the proximal segments.

12. The robotic hand of claim 11, wherein the plurality of hingedly connected segments on the thumb comprises:

the proximal segment and a distal segment, the distal segment being pivotally linked to a decoupling assembly such that the distal segment bends independent of the proximal segment.

13. The robotic hand of claim 11, further comprising:

a plurality of yokes each positioned between the palm housing and a respective proximal segment of a dexterous finger, each proximal segment being pivotally moveable with respect to the palm housing such that the proximal segment of the dexterous finger independently moves in directions having at least two degrees of freedom;

another groove disposed in the proximal segment of each dexterous finger, the another groove and the groove being spaced on opposite sides of a centerline of the yoke to achieve yaw movement, the another groove having another first curvilinear cam surface and another second curvilinear cam surface, the another first curvilinear surface having an another first area of curvature and the another second curvilinear cam surface having an another second area of curvature, the another second curvilinear cam surface being opposite the another first area of curvature relative to the another first curvilinear cam surface and the another first curvilinear cam surface being opposite the another second area of curvature relative to the second curvilinear cam surface;

a plurality of another lead screw assemblies each supported on the palm housing, each another lead screw assembly including another cable end and another coupling end;

a plurality of another cables are secured within a respective another groove; and a plurality of another actuators each operatively connected to the another coupling end of a respective another lead screw assembly for actuating a respective another cable to move the proximal segment of the dexterous finger in directions having at least two degrees of freedom.

14. The robotic hand of claim 1, further comprising:
a decoupling lead screw assembly supported by the palm housing, the decoupling lead screw assembly including a cable end and a coupling end;
a decoupling mechanism powered by the decoupling lead screw assembly for controlling movement of a finger segment independent of movement of the proximal segment of the respective finger;
a decoupling flexible cable secured to the decoupling lead screw assembly; and
a decoupling actuator operatively connected to the coupling end of the decoupling lead screw assembly for actuating the decoupling flexible cable.

15. The robotic hand of claim 1, further comprising:
a palm member including a first end hingedly connected to the palm housing and a second end for supporting at least one of the plurality of fingers;
a palm lead screw assembly carried by the palm housing, the palm lead screw assembly including a cable end and a coupling end;
a cable secured to the palm member and the cable end of the palm lead screw assembly; and
a palm actuator operatively secured to the coupling end of the palm lead screw assembly for actuating the cable and moving the palm member towards a closed position.

16. The robotic hand of claim 1, further comprising:
a plurality of shock mounts each positioned between the palm housing and a respective finger for mitigating stress transmitted through the respective finger.

17. The robotic hand of claim 1, further comprising:
a plurality of springs each connected to at least one of the plurality of hingedly connected segments of a respective finger for biasing the respective finger towards the opened position.

18. A dexterous robotic hand, comprising:
a palm housing;
a plurality of fingers each movably secured to the palm housing, each finger including a plurality of hingedly connected segments, at least one segment of each finger operatively connected to another segment of the same finger by a pivoting link for transmitting movement to the at least one segment, each finger being pivotally moveable with respect to the palm housing such that each finger may independently move in a direction having at least one degree of freedom between an opened and a closed position;

a palm member including a first end hingedly connected to the palm housing and a second end for supporting at least one of the plurality of fingers;

a plurality of finger lead screw assemblies each supported on the palm housing, each finger lead screw assembly including a cable end and a coupling end;

a plurality of cables each secured to a respective finger;

a plurality of finger actuators each operatively connected to the coupling end of a respective finger lead screw assembly for actuating a respective cable and moving a respective finger between the opened and closed position;

a palm lead screw assembly supported on the palm housing; and a palm actuator operatively connected to the palm lead screw assembly for moving the palm member relative to the palm housing.

19. The robotic hand of claim 18, wherein each of the plurality of finger lead screw assemblies comprises:
a tubular sleeve having a sleeve axis;
a body movably mounted at least partially within the tubular sleeve for movement relative to the tubular sleeve along the sleeve axis, the body including a distal end for interconnection with the cable and a proximal end; and
a lead screw disposed at least partially within the tubular sleeve, the lead screw having a proximal end threadably connected to the proximal end of the body and a distal end rotatably mounted within the coupling end such that rotation of the lead screw produces movement of the body and at least a portion of the cable along the sleeve axis.

20. The robotic hand of claim 18, further comprising:
a plurality of shock mounts each positioned between the palm housing and a respective finger for mitigating stress transmitted through the respective finger.

21. The robotic hand of claim 18, further comprising:
a forearm section for housing the plurality of finger actuators;
a wrist cuff pivotally attached to the palm housing and pivotally attached to the forearm section, the wrist cuff having a through opening therein;
a first and a second shock loader each positioned within the forearm section and attached to the wrist cuff for mitigating stress exerted on the hand; and
a first and a second wrist actuator operatively connected to the palm housing for transmitting pivotal movement to the palm housing relative to the forearm section in directions having at least two degrees of freedom defined by the pivotal connection of the wrist cuff to the forearm section and the pivotal connection of the palm housing to the wrist cuff.

22. The robotic hand of claim 21, further comprising:
a plurality of flexible shafts each passing through the through opening in the wrist cuff and having a first end connected to a respective finger actuator and a second end connected to a respective coupling end of a lead screw assembly for transmitting rotational movement from a respective finger actuator to a respective lead screw assembly.

23. A dexterous robotic hand, comprising:
a palm housing;
a plurality of flexible fingers each movably secured to the palm housing, each finger including a proximal segment supported by the palm housing and to another segment supported by the proximal segment;

a decoupling mechanism pivotally supported on the proximal segment of at least one of the plurality of fingers for controlling movement of the another segment independent of movement of the proximal segment;

a plurality of lead screw assemblies each supported on the palm housing, each lead screw assembly including a coupling end;

a plurality of finger actuators each operatively connected to a coupling end for moving the proximal segment of a respective finger relative to the palm housing;

a decoupling lead screw assembly supported b the palm housing, the decoupling lead screw assembly including a coupling end; and a decoupling actuator operatively connected to the coupling end of the decoupling lead screw assembly for pivotally rotating the decoupling mechanism relative to the proximal segment.

24. The dexterous robotic hand of claim 23, further comprising:

a plurality of flexible cables each for interconnecting an actuator with a respective lead screw assembly.

25. The dexterous robotic hand of claim 23, further comprising:

a link member for mechanically interconnecting the decoupling mechanism with the another segment.

26. The dexterous robotic hand of claim 23, further comprising:

a cable interconnecting the decoupling lead screw assembly and the decoupling mechanism, the cable being interconnected such that pivotal movement of the proximal segment with respect to the palm housing is independent of pivotal movement of the another segment relative to the proximal segment.

27. The robotic hand of claim 23, wherein the plurality of flexible fingers comprises:

a dexterous finger, a grasping finger and a thumb each movably secured to the palm housing;

the grasping finger being positioned opposite the thumb relative to the dexterous finger; and the thumb being pivotally connected to the palm housing at a position spaced from a plane of the pivotal connection of the dexterous finger and the grasping finger with the palm housing.

28. The robotic hand of claim 27, wherein a plurality of hingedly connected segments on the dexterous finger comprises:

the proximal segment, an intermediate segment and a distal segment, the intermediate segment being pivotally linked to the decoupling assembly such that the intermediate and distal segment bend independent of the proximal segments.

29. The robotic hand of claim 27, wherein a plurality of hingedly connected segments on the grasping finger comprises:

the proximal segment, an intermediate segment and a distal segment, the proximal, intermediate and distal segments being pivotally linked such that the intermediate and distal segments simultaneously bend as a function of the bending of the proximal segment.

30. The robotic hand of claim 27, wherein a plurality of hingedly connected segments on the thumb comprises:

the proximal segment and a distal segment, the distal segment being pivotally linked to the decoupling assembly such that the distal segment bends independent of the proximal segment.

31. A robotic finger drive train for positioning a finger with respect to a palm housing, comprising:

a drive train actuator;

a flexible shaft rotated by the drive train actuator;

a lead screw assembly for converting rotary motion of the flexible shaft into linear motion; and a cable linearly moveable in response to a lead screw assembly and interconnected with the finger for pivoting the finger with respect to the palm housing.

32. The robotic finger drive train as defined in claim 31, wherein the lead screw assembly comprises:

a tubular sleeve having a sleeve axis;

a body movably mounted at least partially within the tubular sleeve for movement relative to the tubular sleeve along the sleeve axis, the body including a distal end for interconnection with the cable and a proximal end; and a lead screw disposed at least partially within the tubular sleeve, the lead screw having a proximal end threadably connected to the proximal end of the body and a distal end rotatably mounted within the coupling end such that rotation of the lead screw produces movement of the body and at least a portion of the cable along the sleeve axis.

33. The robotic finger drive train of claim 32, further comprising:

a gauge attached to the tubular sleeve for sensing stress on the robotic finger cable.

34. The robotic finger drive train of claim 31, further comprising:

a decoupling lead screw assembly supported by the palm housing, the decoupling lead screw assembly including a cable end and a coupling end;

a decoupling mechanism powered by the decoupling lead screw assembly for controlling movement of a finger segment independent of movement of a proximal segment of the respective finger;

a decoupling flexible cable secured to the decoupling lead screw assembly; and a decoupling actuator operatively connected to the coupling end of the decoupling lead screw assembly for actuating the decoupling flexible cable.

35. The robotic finger drive train of claim 34, wherein the decoupling lead screw assembly is pivotally connected to the proximal segment of the finger and enables controlled movement of an intermediate finger segment and distal finger segment independent of movement of the proximal finger segment.

* * * * *